US009830555B2

(12) United States Patent
Marandi et al.

(10) Patent No.: US 9,830,555 B2
(45) Date of Patent: Nov. 28, 2017

(54) COMPUTATION USING A NETWORK OF OPTICAL PARAMETRIC OSCILLATORS

(71) Applicants: The Board of Trustees of the Leland Stanford Junior University, Stanford, CA (US); Inter-University Research Institute Corporation, Research Organization of Information and Systems, Tokyo (JP)

(72) Inventors: Alireza Marandi, Stanford, CA (US); Yoshihisa Yamamoto, Stanford, CA (US); Robert Byer, Stanford, CA (US); Zhe Wang, Stanford, CA (US); Shoko Utsunomiya, Tokyo (JP)

(73) Assignees: The Board of Trustees of the Leland Stanford Junior University, Stanford, CA (US); Inter-University Research Institute Corporation, Research Organization of Information and Systems, Tokyo (JP)

( * ) Notice: Subject to any disclaimer, the term of this patent is extended or adjusted under 35 U.S.C. 154(b) by 79 days.

(21) Appl. No.: 14/904,040

(22) PCT Filed: Jul. 9, 2014

(86) PCT No.: PCT/US2014/046025
§ 371 (c)(1),
(2) Date: Jan. 8, 2016

(87) PCT Pub. No.: WO2015/006494
PCT Pub. Date: Jan. 15, 2015

(65) Prior Publication Data
US 2016/0162798 A1 Jun. 9, 2016

Related U.S. Application Data

(60) Provisional application No. 61/844,322, filed on Jul. 9, 2013.

(51) Int. Cl.
*G06E 1/04* (2006.01)
*G06N 99/00* (2010.01)
(Continued)

(52) U.S. Cl.
CPC ............. *G06N 99/002* (2013.01); *G02F 3/00* (2013.01); *G06E 3/005* (2013.01); *G02F 1/39* (2013.01)

(58) Field of Classification Search
CPC ............................... G06N 99/002; G02F 3/00
(Continued)

(56) References Cited

U.S. PATENT DOCUMENTS

2006/0239695 A1  10/2006  Sayyah
2009/0135860 A1  5/2009  Maleki et al.
(Continued)

OTHER PUBLICATIONS

International Search Report for International Application No. PCT/US2014/046025 dated Oct. 27, 2014, 3 pages.
(Continued)

*Primary Examiner* — Tan V. Mai
(74) *Attorney, Agent, or Firm* — Foley & Lardner LLP; Cliff Z. Liu

(57) ABSTRACT

In one aspect, a computational machine includes an optical device configured to receive energy from an optical energy source and generate a number N1 of optical signals, and a number N2 of coupling devices, each of which controllably couples a plurality of the number N1 optical signals. The coupling devices are individually controlled to simulate a computational problem. In another aspect, a computational machine includes a number N1 of parametric oscillators and a number N2 of coupling devices, each of which controllably couples a plurality of the number N1 of parametric oscillators together. The coupling devices are individually controlled to simulate a computational problem.

20 Claims, 21 Drawing Sheets

(51) Int. Cl.
*G02F 3/00* (2006.01)
*G06E 3/00* (2006.01)
*G02F 1/39* (2006.01)

(58) Field of Classification Search
USPC .......................................... 708/191
See application file for complete search history.

(56) References Cited

U.S. PATENT DOCUMENTS

| | | |
|---|---|---|
| 2010/0321765 A1 | 12/2010 | Caprara |
| 2011/0194172 A1 | 8/2011 | Esteban Martin et al. |
| 2012/0194893 A1* | 8/2012 | Maleki .................... G02F 2/02 359/246 |
| 2013/0162952 A1 | 6/2013 | Lippey et al. |
| 2014/0016168 A1 | 1/2014 | Marandi et al. |
| 2014/0218717 A1* | 8/2014 | Zhang .................... G01K 11/32 356/32 |
| 2014/0270786 A1* | 9/2014 | Poddar .................. H04B 10/61 398/116 |
| 2015/0002920 A1* | 1/2015 | Shi .......................... G02F 1/01 359/276 |
| 2016/0243261 A1* | 8/2016 | Min ....................... G01N 33/583 |

OTHER PUBLICATIONS

Written Opinion of the International Searching Authority (ISA/KR) for International Application No. PCT/US2014/046025 dated Oct. 27, 2014, 6 pages.

\* cited by examiner

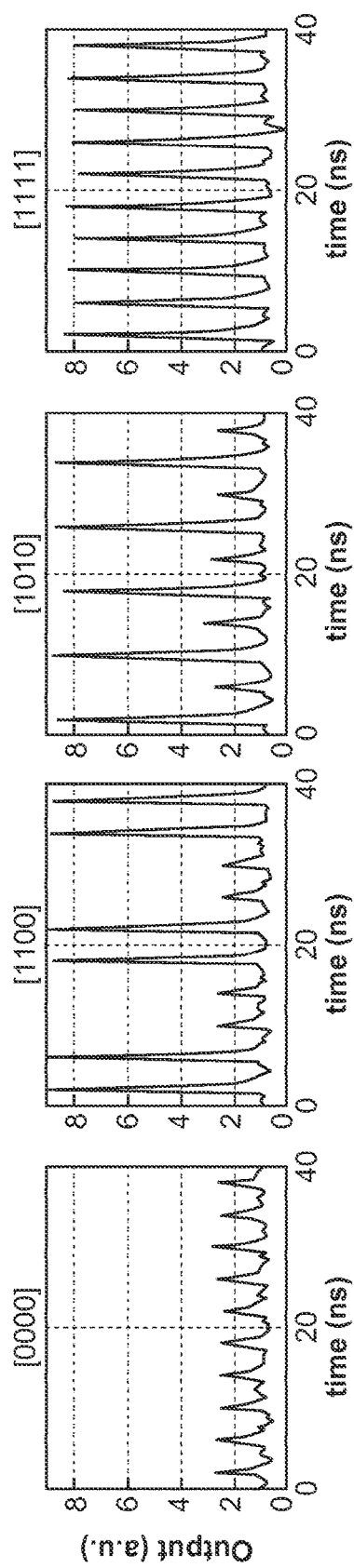
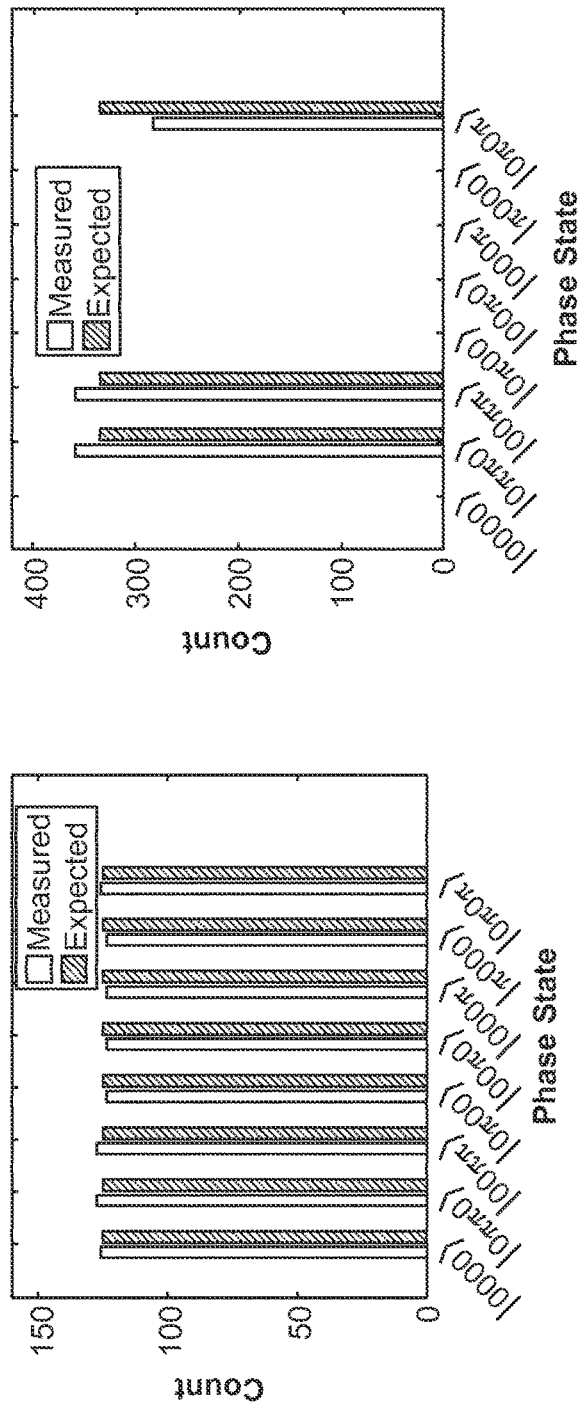
FIG. 13A
FIG. 13B
FIG. 13C

COMPUTATION USING A NETWORK OF OPTICAL PARAMETRIC OSCILLATORS

CROSS-REFERENCE TO RELATED PATENT APPLICATIONS

This application is a national stage entry of International Application No. PCT/US2014/046025 filed Jul. 9, 2014, which claims the benefit of U.S. Provisional Patent Application 61/844,322 filed Jul. 9, 2013 to Marandi et al., titled "Quantum Computing Using Coupled Parametric Oscillators," the contents of which are incorporated herein by reference in their entirety.

BACKGROUND

A class of computational problems exists that cannot be solved with presently available computers efficiently in a reasonable amount of time, because the time required to solve such problems increases exponentially with the number of variables in the problem. This class is referred to as problems of nondeterministic polynomial time (NP). It would be beneficial in many fields of study to have a computer capable of solving NP problems in a realistic amount of time.

SUMMARY

In one aspect, a computational machine includes an optical device configured to receive energy from an optical energy source and generate a number N1 of optical signals, and a number N2 of coupling devices, each of which controllably couples a plurality of the number N1 optical signals. The coupling devices are individually controlled to simulate a computational problem. In another aspect, a computational machine includes a number N1 of parametric oscillators and a number N2 of coupling devices, each of which controllably couples a plurality of the number N1 of parametric oscillators together. The coupling devices are individually controlled to simulate a computational problem.

BRIEF DESCRIPTION OF THE DRAWINGS

FIG. 13A illustrates some test results for the setup of FIG. 11A.

FIG. 13B illustrates a histogram of phase states when all couplings are blocked.

FIG. 13C illustrates a histogram of phase states when all couplings are unblocked and the phases are locked.

DETAILED DESCRIPTION

Figure 1:
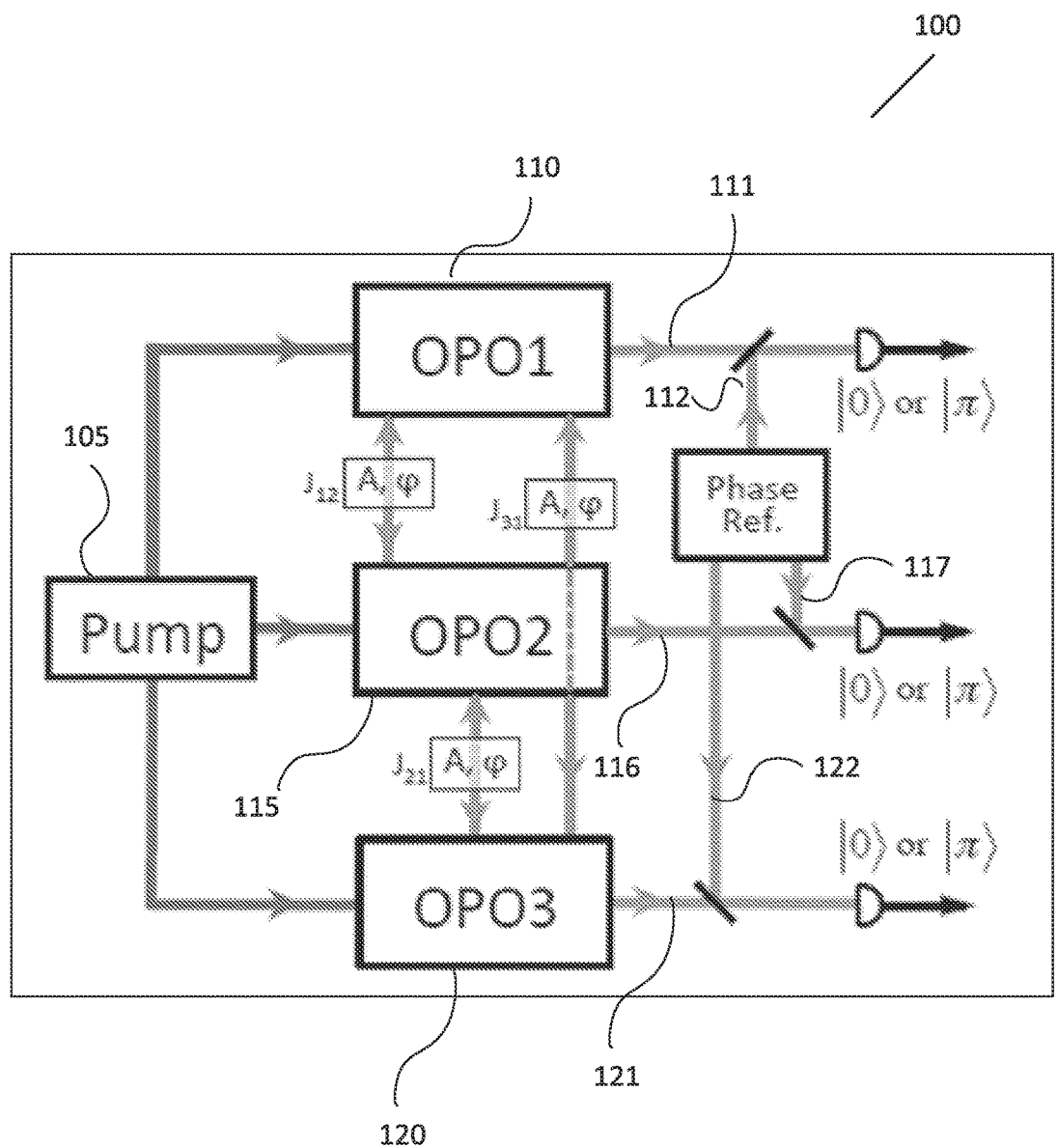
FIG. 1 illustrates an example of an optical computational machine with N1=3 and N2=3.

A computational machine as described in this disclosure finds absolute or approximate solutions for computational problems, including nondeterministic polynomial time computational problems. Among other solutions, the computational machine finds solutions for computational problems in the complexity class of "nondeterministic polynomial time," known as "NP" in computational complexity theory, and further finds solutions for NP problems for which no polynomial-time technique is available. A subset of NP problems is NP-complete problems. An NP problem may be mapped to an NP-complete problem with a polynomial time algorithm.

One example of an NP-complete problem is the Ising problem. The Ising problem is to find a lowest-energy configuration, or ground state, for the Ising model. An Ising model represents N sites in a magnetic structure, where a site represents a magnetic dipole, each site is coupled to a number of other sites, and each site has a spin state of either +1 or −1. As the number of sites N and the number of couplings between the sites increases, the complexity of finding the ground states of the model increases exponentially, representing an NP-complete problem.

The computational machine described in this disclosure provides solutions for NP problems. The NP-complete Ising problem is used as a non-limiting example in this disclosure by way of illustration. The computational machine provides solutions for other NP and NP-complete problems also. For example, another NP-complete problem that may be solved using the computational machine is the MAX-CUT problem from graph theory. Other problems include analyses of large social networks, and combinatorial optimization problems.

An Ising problem is explained as including a number N of sites and a matrix J of coupling terms between sites. At approximately N=30, the computational complexity of the problem exceeds the capability of existing supercomputers to find all solutions for all problems in finite time. The computational machine of this disclosure, however, is able to provide a solution for the Ising problem in which N is orders of magnitude greater than N=30. In one embodiment, optical parametric oscillators (OPOs) operating at degeneracy are used to simulate the spins in the Ising model. When pumped by a strong source, a degenerate OPO takes one of two phase states corresponding to spin +1 or −1 in the Ising model. A network of N substantially identical OPOs with mutual coupling are pumped with the same source to simulate an Ising spin system. On introducing the pump, after a transient period, the computational machine converges to one of the ground states and stays in it. The phase state selection process depends on the vacuum fluctuations and mutual coupling of the OPOs. In some implementations, the pump is pulsed at a constant amplitude, in other implementations the pump output is gradually increased, and in yet further implementations, the pump is controlled in other ways.

The computational machine includes a number N1 of degenerate OPOs and a number N2 of configurable couplings used for coupling the optical fields between OPOs. The configurable couplings may be configured to be off, or configured to be on. Turning the couplings on and off may be performed gradually or abruptly. When configured to be on, the configuration may provide any phase or amplitude depending on the coupling matrix (J) of the Ising problem. The computational machine as configured for the Ising problem uses a number M1 of the N1 degenerate OPOs and configures a number M2 of the couplings to be on in a certain state. For some of the Ising problems, each of the M2 couplings are configured to be in the same state. For other problems, the couplings may be configured to be in different states.

FIG. 1 illustrates an example of a computational machine 100 in the form of a degenerate OPO network configured for solving an N=3 Ising problem. A pump source provides pump energy to three substantially identical degenerate OPOs 110, 115, 120 (labeled as OPO1, OPO2, and OPO3, respectively.) Pump energy may be provided as pulses or continuously. The three OPOs are coupled to each other according to a coupling matrix J. As illustrated in FIG. 1, OPO1 is coupled to OPO2 with a coupling amplitude and phase identified in matrix element $J_{1,2}$, OPO2 is coupled to OPO3 with a coupling amplitude and phase identified in matrix element $J_{2,3}$, and OPO3 is coupled to OPO1 with a coupling amplitude and phase identified in matrix element $J_{3,1}$. One example Ising problem is where the coupling amplitudes are substantially equal, and each coupling phase is equal to pi ($\pi$).

When uncoupled, each degenerate OPO produces an output that randomly has either zero phase or $\pi$ phase. When coupled, the network of OPO1, OPO2, and OPO3 settles into a ground state with non-random outputs, where each output 111, 116, 121, respectively, is at either zero phase or pi phase. Each OPO output is combined with a phase reference 112, 117, or 122, and the result is captured at a photodetector. The OPO outputs 111, 116, 121 represent the Ising model in a ground state. For example, a zero phase may represent a −1 spin state, and a $\pi$ phase may represent a +1 spin state in the Ising model. Each time the system of FIG. 1 is turned on, it selects one of the ground states of the programmed Ising problem.

Figure 2:
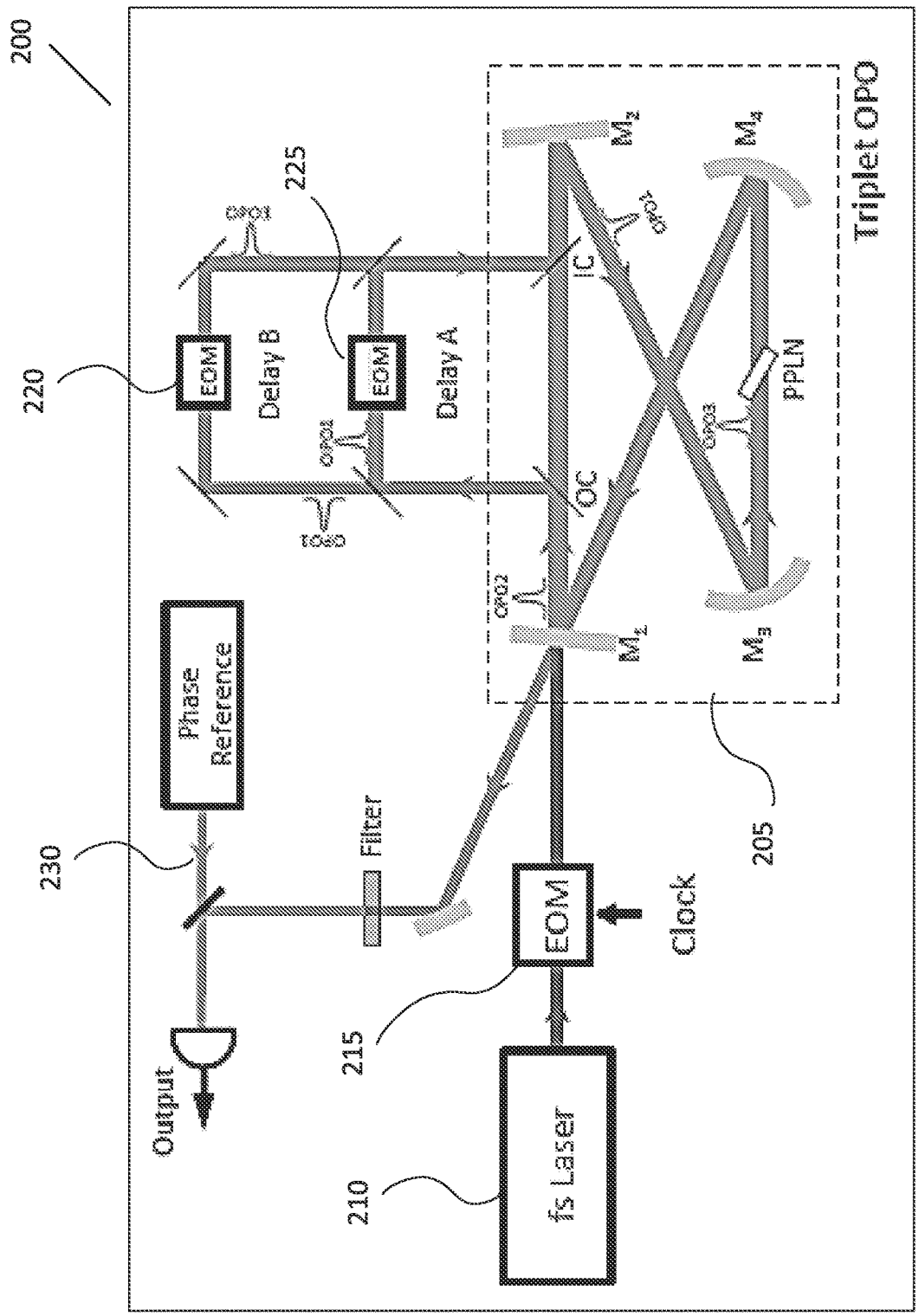
FIG. 2 illustrates another example of an optical computational machine, with N1=3 temporally separated optical parametric oscillators (OPOs) and N2=2 coupling devices.

FIG. 2 illustrates an example of a computational machine 20 in the form of a degenerate OPO network configured for solving an N=3 Ising problem. In this example, the OPO network is implemented using a triplet OPO 205, in which a resonant cavity of the triplet OPO is configured to have a round-trip time equal to three times the period of pulses from a pump source. In this example, the pump source is shown as laser 210 and clock 215. Round-trip time as used herein indicates the time for light to propagate along one pass of a described recursive path. Thus, the round-trip time for the triplet OPO of FIG. 2 indicates the time for light to propagate from entry to the triplet OPO at reflector M1, through reflectors M2, M3, and M4, and back to reflector M1.

Three pulses of a pulse train with period P equal to one-third of the resonator cavity round-trip time may propagate through triplet OPO 205 of FIG. 2 concurrently without interfering with each other. Therefore, three independent pulse trains can act as three temporally separated OPOs, which are illustrated in FIG. 2 as waves labeled OPO1, OPO2, and OPO3. Two delay lines, namely delays A and B, are used for mutual coupling of the OPOs, and the modulators 220, 225 synchronously control the strengths and phases of couplings, allowing for programming of the computational machine illustrated to simulate a desired problem. Delay A is for coupling (OPO1 to OPO2), (OPO2 to OPO3), and (OPO3 to OPO1), and Delay B is for coupling (OPO1 to OPO3), (OPO2 to OPO1), and (OPO3 to OPO2). The phase states of the OPOs can be measured by interfering the output of triplet OPO 205 and a phase reference 230.

Figure 3:
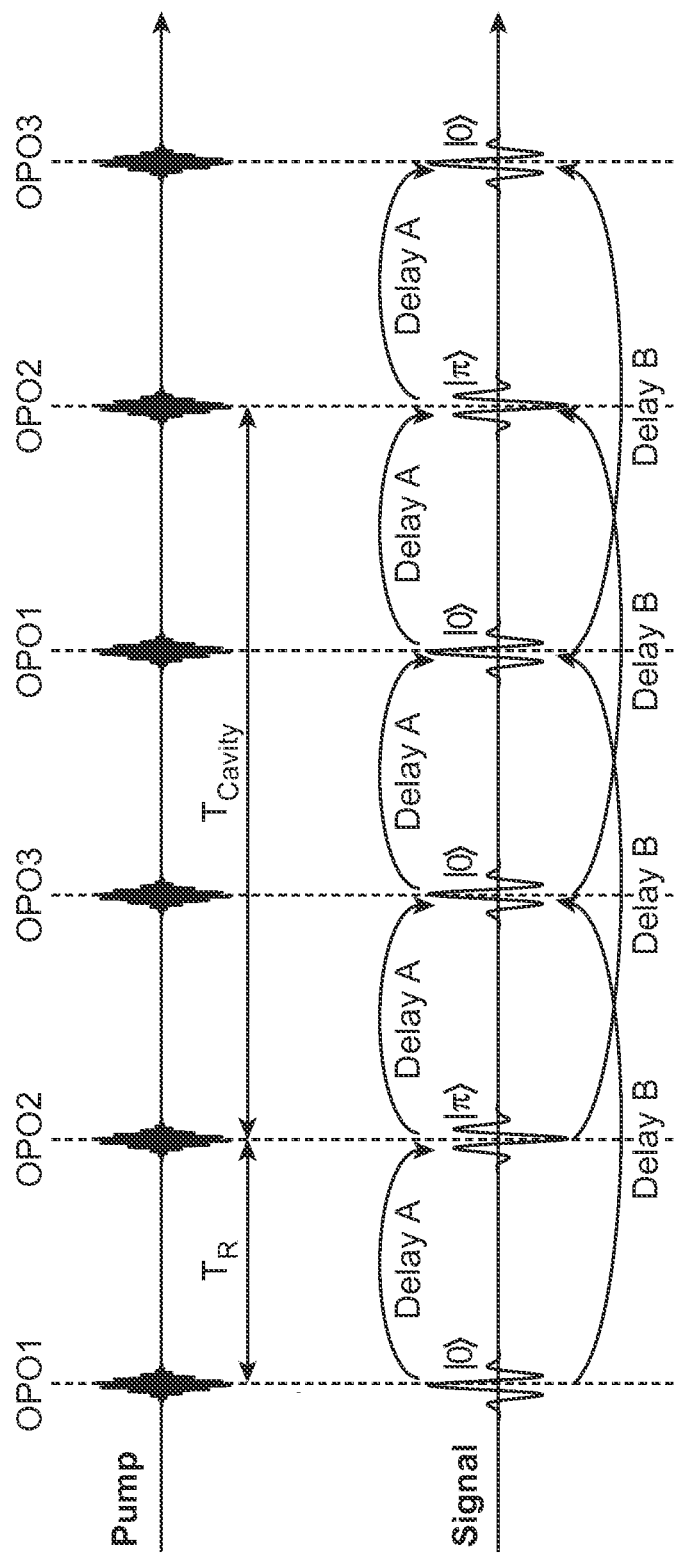
FIG. 3 illustrates an example of optical source pump pulses and corresponding OPO output signal pulses.

FIG. 3 illustrates for the system in FIG. 2 an example in which pulse trains are provided by the pump source. As illustrated, the state into which the system converges (e.g., the simulation of an Ising model ground state) is one in which OPO1 has phase zero, OPO2 has phase $\pi$, and OPO3 has phase zero. The arrows on the signal pulses depict how the temporally separated OPOs are mutually coupled using the delay lines.

Generally, to implement a network of a number R of OPOs, for a pulsed pump, the round-trip time of the resonator cavity may be increased so as to be R times the repetition period $T_R$ of the pump pulses. Correspondingly, a number R−1 of modulators and delay lines may be used to control amplitude and phase of coupling between OPOs. The network of OPOs can be achieved using commercially available mode locked lasers and optical elements. For one example, a commercial Ti:S mode locked laser with a 1 GHz repetition rate can be used to pump a degenerate OPO with a cavity length of about 6 meters (N=20). Telecom fiber delay lines, modulators, and other optical devices can be used to implement the OPO-based Ising machine. The number of sites N may be increased by increasing the OPO cavity length and/or using a higher repetition rate mode-locked laser.

Figure 4:
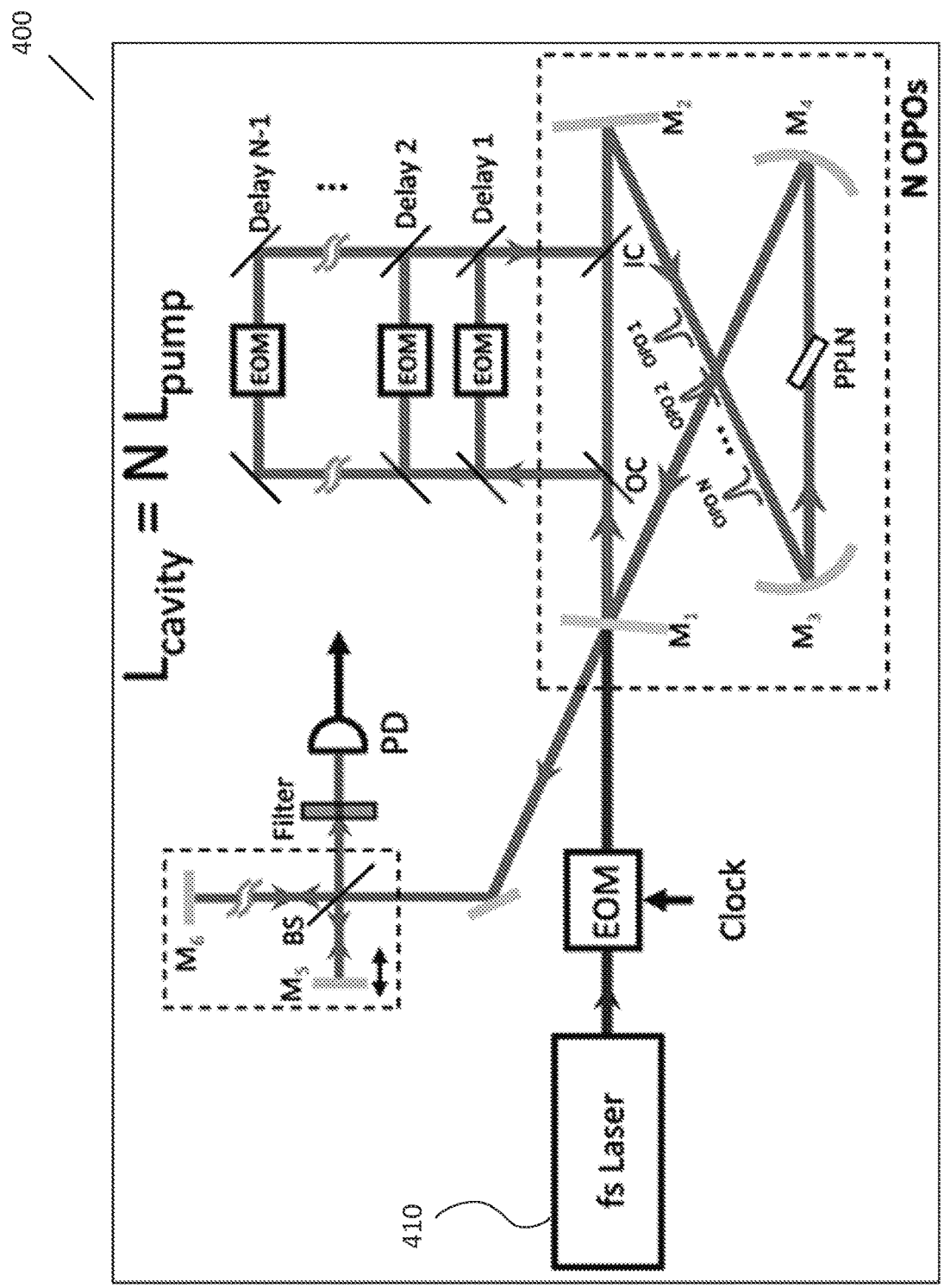
FIG. 4 illustrates another example of an optical computational machine, with N1=N and N2=N−1.

FIG. 4 illustrates an example of a computational machine 400 for determining solutions for a number of sites N. To measure the phase states of the OPOs, an unequal arm Michelson interferometer 410 may be used as shown. Each OPO pulse is interfered with the next pulse, and therefore the relative phase states of consecutive OPOs are measured.

A computational machine in accordance with this disclosure may be implemented using optical fiber technologies, such as fiber technologies developed for telecommunications applications. For example, to accommodate 100 femtosecond (fs) pulses separated by 1 picosecond (ps), a 1 microsecond (μs) long OPO (approximately 200 meters of fiber) can implement $10^6$ OPOs. The couplings can be realized with fibers and controlled by optical Kerr shutters.

A computational machine in accordance with this disclosure may be implemented using miniaturized OPOs, which can be implemented in Planar Lightwave Circuits (PLCs) or using micro and nano resonators.

Figure 5:
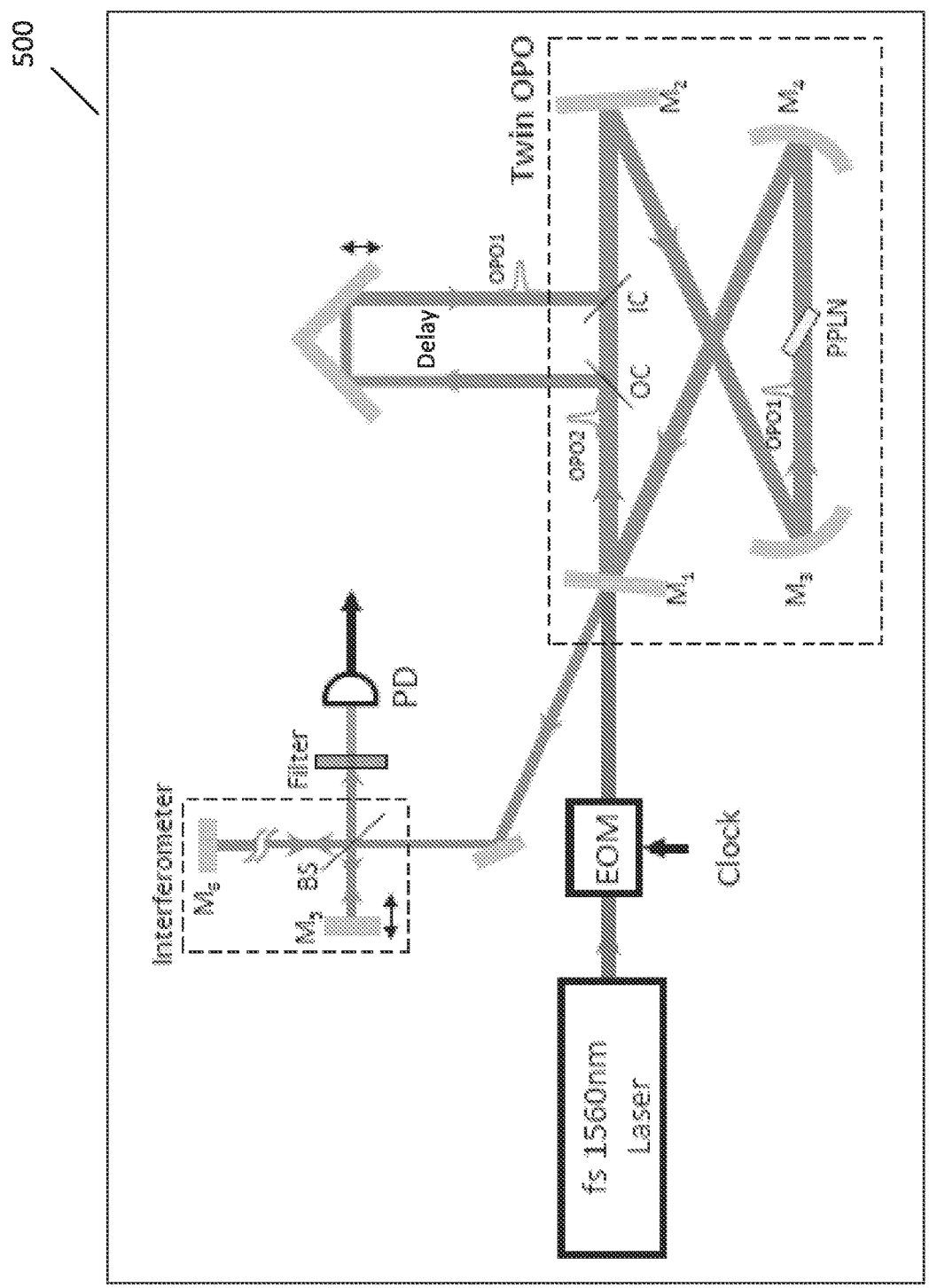
FIG. 5 illustrates another example of an optical computational machine, with N1=2 and N2=1.

FIG. 5 illustrates an example of an OPO-based computational machine 500 configured to solve the basic problem presented by an N=2 Ising model. A twin (N=2) OPO was used with a single delay to controllably introduce coupling between the OPOs.

Figure 6:
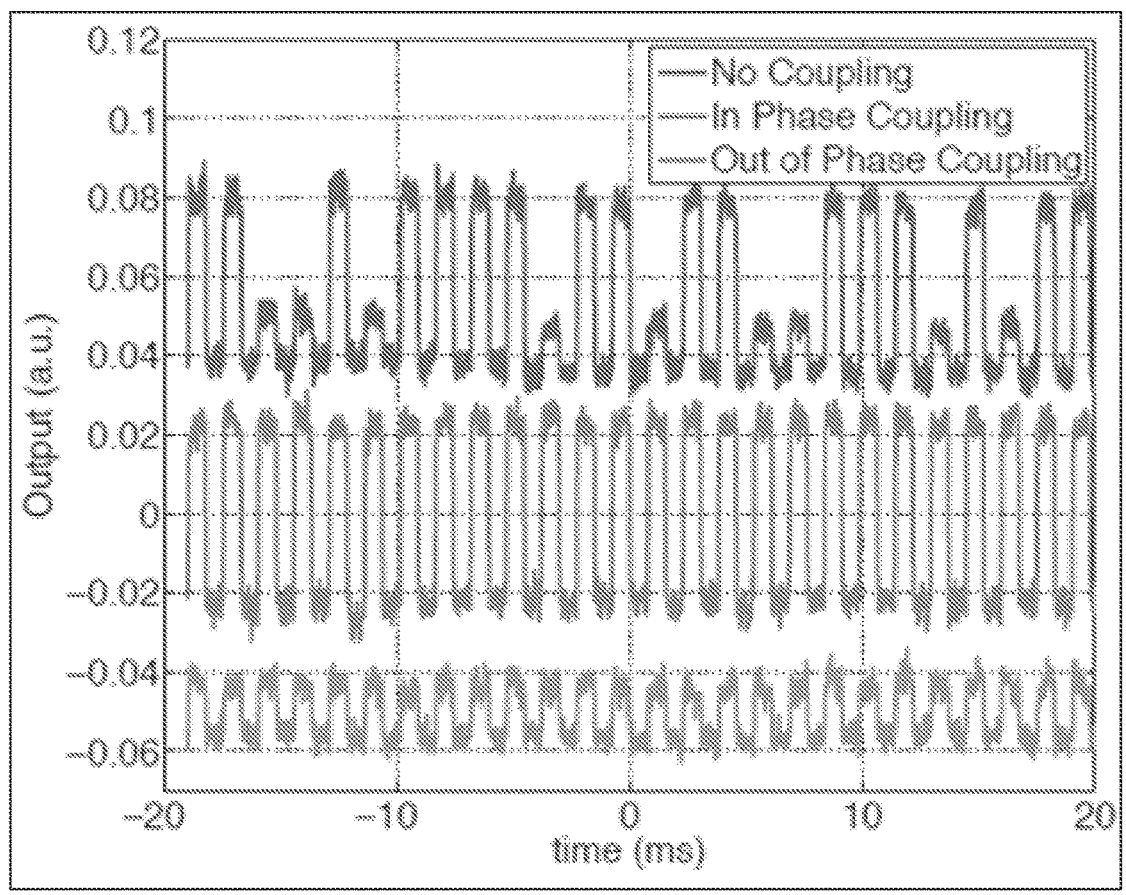
FIG. 6 illustrates an example of effects of coupling in an OPO based computational machine, with N1=2.

FIG. 6 illustrates the results from operating the computational machine of FIG. 5 with no coupling (top trace), with in-phase coupling (middle trace), and with out-of-phase coupling (bottom trace). When there is no coupling, each OPO output randomly takes one of the states zero or π, represented by the random switching between a higher voltage or a lower voltage, as measured by a photodetector. Where there is in-phase coupling, both OPOs take the same phase state, which is represented by a higher voltage as measured by a photodetector. When there is out-of-phase coupling, the OPOs take opposite phase states and cancel each other, which is represented by the lower voltage as measured by a photodetector, where the lower voltage includes system noise.

Having described a computational machine for solving NP problems, a theoretical basis for using the computational machine to solve the Ising problem is next described.

The Ising problem is to find the ground states of the Ising Hamiltonian H (equation (1)) of a magnetic system consisting of N spins, where each spin $\sigma_j$ takes either +1 or −1, and $J_{jl}$ denotes the coupling between the j-th and the l-th spin.

$$H = -\sum_{1 \leq j < l \leq N} J_{jl} \sigma_j \sigma_l \quad (1)$$

Knowledge of the ground state spin configurations is useful for studying the properties of spin glasses, and helps in solving various combinatorial optimization problems. However, the Ising problem is in the NP-hard category in computational complexity. Many attempts have been undertaken to tackle the believed to be intractable problems by utilizing some analogies with natural systems. For example, a simulated annealing technique mimics the thermal annealing procedure in metallurgy; or alternatively a quantum annealing technique uses the quantum tunneling process. A variant of quantum annealing is quantum adiabatic computation according to the quantum adiabatic theorem. (A comparison of the techniques is presented below with respect to FIG. 14.) Presently, however, no efficient technique exists for NP-hard problems. The computational machine described in this disclosure provides a technique for solving such problems, as described next with respect to degenerate OPOs.

Degenerate OPOs are open dissipative systems that experience second order phase transition at the oscillation threshold. Because of the phase-sensitive amplification, a degenerate OPO could oscillate with a phase of either 0 or π with respect to the pump phase for amplitudes above the threshold. The phase is random, affected by the quantum noise associated in optical parametric down conversion during the oscillation build-up. Therefore, a degenerate OPO naturally represents a binary digit specified by its output phase. Based on this property, a degenerate OPO system may be utilized as an Ising machine. The phase of each degenerate OPO is identified as an Ising spin, with its amplitude and phase determined by the strength and the sign of the Ising coupling between relevant spins. In the following, a theoretical investigation of the system using a set of classical equations is provided.

A degenerate OPO includes a second order nonlinear crystal placed in an optical cavity. Under the drive of a coherent external pump $F_p$ at frequency $\omega_p$, a pump field is excited inside the cavity. Due to the second order susceptibility of the nonlinear crystal, a signal field at frequency $\omega_s$ is generated from the pump field such that $\omega_p = 2\omega_s$. When $F_p$ is classical and its phase is locked to $\phi_p = 0$, then the Hamiltonian H of a degenerate OPO is given by the following equations:

$$H = H_0 + H_{int} + H_{irr} \quad (2)$$

$$H_0 = \hbar\omega_s \hat{a}_s^\dagger \hat{a}_s + \hbar\omega_p \hat{a}_p^\dagger \hat{a}_p \quad (3)$$

$$H_{int} = i\hbar\frac{\kappa}{2}(\hat{a}_s^{\dagger 2}\hat{a}_p - \hat{a}_s^2 \hat{a}_p^\dagger) + i\hbar\sqrt{\gamma_p}(\hat{a}_p^\dagger F_p e^{-i\omega_p t} - \hat{a}_p F_p e^{i\omega_p t}) \quad (4)$$

$$H_{irr} = i\hbar\sqrt{\gamma_s}(\hat{a}_s^\dagger \hat{B}_s - \hat{a}_s \hat{B}_s^\dagger) + i\hbar\sqrt{\gamma_p}(\hat{a}_p^\dagger B_p - \hat{a}_p \hat{B}_p^\dagger) \quad (5)$$

Here, $H_0$ represents the energies of the signal and the pump fields inside the cavity, where $\hat{a}_s^\dagger$, $\hat{a}_s$ are the creation and annihilation operators for the signal field and $\hat{a}_p^\dagger$, $\hat{a}_p$ are the counterparts for the pump field. The first term in $H_{int}$ describes the nonlinear coupling between the signal and the pump fields, where κ is the parametric gain due to the second order susceptibility of the nonlinear crystal; the second term shows the excitation of the internal pump field by the external pump. $H_{irr}$ denotes the irreversible interaction between cavity fields and the reservoir, where $\hat{B}_s$, $\hat{B}_p$ are reservoir operators, and $\gamma_s$, $\gamma_p$ are the signal and the pump photon decay rates, respectively, in the cavity.

Dynamic Analysis

Consider the signal and the pump operators in the rotating frame by defining $\hat{A}_s = \hat{a}_s e^{i\omega_s \tau}$, $\hat{A}_p = \hat{a}_p e^{i\omega_p \tau}$. From the Hamiltonian H in equations (2)-(5), the Heisenberg-Langevin equations (6), (7) of a degenerate OPO are derived.

$$\frac{d}{d\tau}\hat{A}_s = -\frac{\gamma_s}{2}\hat{A}_s + \kappa \hat{A}_s^\dagger \hat{A}_p + \sqrt{\gamma_s}\,\hat{f}_s \quad (6)$$

$$\frac{d}{d\tau}\hat{A}_p = -\frac{\gamma_p}{2}\hat{A}_p - \frac{\kappa}{2}\hat{A}_s^2 + \sqrt{\gamma_p}(F_p + \hat{f}_p) \quad (7)$$

Here, $\hat{f}_s$, $\hat{f}_p$ are the time dependent noise operators to the signal and the pump fields, respectively.

Possible solution outputs from the network can be obtained by solving the c-number Langevin equations with the signal field of each degenerate OPO starting from the vacuum state. However, the existence of quantum noise inputs in these equations makes the computational cost of this technique relatively expensive. An alternative technique ignores the quantum noise terms and replaces them with a random initial condition. In this way, the differential equations to be dealt with switch from stochastic ones to deterministic ones, which considerably improves the efficiency of the numerical simulation. These two techniques provide very similar results in terms of the success probability of the network in finding a correct answer, when the random initial amplitude of the degenerate OPOs is selected to be the same order of magnitude as the quantum noise strength of the network.

A classical description of the system can be obtained by treating each operator A as a complex number $\tilde{A}$. If the optical cavity is singly resonant with the signal field, $\gamma_s \ll \gamma_p$, then $$\frac{d}{d\tau}\hat{A}_p \approx 0$$

follows by the adiabatic approximation. Under the above assumptions, and neglecting the noise terms, the dynamics of a degenerate OPO is governed by equation (8A), where $\tilde{A}_s$ is the complex amplitude of the signal field and $\tilde{A}^*_s$ is its complex conjugate.

$$\frac{d}{d\tau}\tilde{A}_s = -\frac{\gamma_s}{2}\tilde{A}_s + \kappa\left(\frac{2}{\sqrt{\gamma_p}}F_p - \frac{\kappa}{\gamma_p}\tilde{A}_s^2\right)\tilde{A}_s^* \tag{8A}$$

Equation 8A simplifies calculation by neglecting the noise term, as described above. Alternatively, noise terms may be added to equation (8A), as shown in equation (8B).

$$\frac{d}{d\tau}\tilde{A}_s = -\frac{\gamma_s}{2}\tilde{A}_s + \kappa\left(\frac{2}{\sqrt{\gamma_p}}F_p - \frac{\kappa}{\gamma_p}\tilde{A}_s^2\right)\tilde{A}_s^* + \frac{2\kappa}{\sqrt{\gamma_p}}\tilde{A}_s^* \hat{f}_p + \sqrt{\gamma_s}\hat{f}_s \tag{8B}$$

The classical dynamic equations for a system of N coupled degenerate OPOs can be obtained by further including the mutual coupling among the degenerate OPOs. Suppose that the signal amplitude $\tilde{A}_j$ of the j-th degenerate OPO couples to that of the l-th degenerate OPO by $\frac{1}{2}\xi_{jl}$, then the behavior of the network can be described by a set of N nonlinear differential equations, as shown in (9A) neglecting noise, or in (9B) with a noise term.

$$\frac{d}{d\tau}\tilde{A}_j = -\frac{\gamma_s}{2}\tilde{A}_j + \kappa\left(\frac{2}{\sqrt{\gamma_p}}F_p - \frac{\kappa}{\gamma_p}\tilde{A}_j^2\right)\tilde{A}_j^* + \frac{1}{2}\sum_{l=1,l\neq j}^{N}\xi_{jl}\gamma_s\tilde{A}_l \tag{9A}$$

$$\frac{d}{d\tau}\tilde{A}_j = -\frac{\gamma_s}{2}\tilde{A}_j + \kappa\left(\frac{2}{\sqrt{\gamma_p}}F_p - \frac{\kappa}{\gamma_p}\tilde{A}_j^2\right)\tilde{A}_j^* + \tag{9B}$$

$$\frac{1}{2}\sum_{l=1,l\neq j}^{N}\xi_{jl}\gamma_s\tilde{A}_l + \frac{2\kappa}{\sqrt{\gamma_p}}\tilde{A}_j^*\hat{f}_{p,j} + \sqrt{\gamma_s}\hat{f}_{s,j}$$

The system can also be equivalently described by the dynamics of the real number in-phase components $C_j$ and the quadrature components $S_j$ of the complex amplitudes $\tilde{A}_j$. To facilitate the analysis, normalized dynamic equations for the in-phase and quadrature components are utilized (e.g., equations (10), (11)), where $$t = \frac{\gamma_s}{2}\tau$$

is unitless time, $$p = \frac{F_p}{F_{th}}$$

is normalized pump rate, $$F_{th} = \frac{\gamma_s\sqrt{\gamma_p}}{4\kappa}$$

is threshold pump flux, and $c_j=C_j/A_s$, $s_j=S_j/A_s$ are normalized in-phase and quadrature components.

$$A_s = \sqrt{\frac{\gamma_s\gamma_p}{2\kappa^2}}$$

is the signal amplitude of a single degenerate OPO when p=2.

$$\frac{d}{dt}c_j = (-1 + p - (c_j^2 + s_j^2))c_j + \sum_{l=1,l\neq j}^{N}\xi_{jl}c_l \tag{10}$$

$$\frac{d}{dt}s_j = (-1 + p - (c_j^2 + s_j^2))s_j + \sum_{l=1,l\neq j}^{N}\xi_{jl}s_l \tag{11}$$

The above equations indicate that the dynamics of the system are influenced by the values of p and $\xi_{jl}$.

Steady State Analysis

For a single degenerate OPO pumped above the threshold, equations (8A), (8B) implies that its quadrature component at the steady state is 0 so that its phase is either 0 or π. If all of the N coupled degenerate OPOs also have the same property, a corresponding spin configuration can be obtained by assigning $\sigma_j=+1$ to the j-th degenerate OPO if $c_j>0$ or $\sigma_j=-1$ if $c_j<0$. Due to the mutual coupling of the degenerate OPOs, appropriate relations between the normalized pump rate p and the coupling strength $\xi_{jl}$ are specified to identify each degenerate OPO as an Ising spin at the steady state. In the following, the threshold of the coupled degenerate OPO network and a sufficient condition to guarantee that all the quadrature components of the degenerate OPOs are 0 at the steady state are derived.

Oscillation Threshold

The in-phase and the quadrature components of N coupled degenerate OPOs satisfy equations (12), (13) at the steady state.

$$c_j^3 + (1-p+s_j^2)c_j - \sum_{l=1,l\neq j}^{N} \xi_{jl} c_l = 0 \quad (12)$$

$$s_j^3 + (1-p+c_j^2)s_j - \sum_{l=1,l\neq j}^{N} \xi_{jl} s_l = 0 \quad (13)$$

A trivial steady state of the system is $c_j=s_j=0$, $\forall j \in \{1, 2, \ldots, N\}$. To exclude the possibility that the system approaches this steady state, the largest eigenvalue of the corresponding Jacobian matrix (14) has to be positive. $I_N$ is the N×N identity matrix, and G is as in (15).

$$J_0 = \begin{pmatrix} -(1-p)I_N - G & 0 \\ 0 & -(1+p)I_N - G \end{pmatrix} \quad (14)$$

$$G = \begin{pmatrix} 0 & -\xi_{12} & \cdots & -\xi_{1N} \\ -\xi_{21} & 0 & \cdots & -\xi_{2N} \\ \vdots & \vdots & \ddots & \vdots \\ -\xi_{N1} & -\xi_{N2} & \cdots & 0 \end{pmatrix} \quad (15)$$

For any hermitian matrix A, let $\lambda_{min}(A)$ and $\lambda_{max}(A)$ be its smallest and the largest eigenvalues, respectively. Then, when $\xi_{jl}=\xi_{lj}$, $j, l \in \{1, 2, \ldots, N\}$, the condition $\lambda_{max}(J_0)>0$ yields $$\lambda_{min}(G) < p-1 \quad (16)$$

which gives a lower bound for the normalized pump rate p to excite the oscillation of the network given the mutual coupling $\xi_{jl}$. Since $Tr(G)=0$, then $\lambda_{min}(G)<0$. This suggests that the threshold of the network is smaller than the threshold of its individual components due to the mutual coupling, which shows connections to the self-ignition effect in neural networks.

Quadrature Components

Equation (17) is equation (13), in which the j-th quadrature component is multiplied by $s_j$, and summed over all the equations.

$$\sum_{j=1}^{N} s_j^4 + \sum_{j=1}^{N} a_j s_j^2 - \sum_{j=1}^{N} \sum_{l=1,l\neq j}^{N} \xi_{jl} s_j s_l = 0 \quad (17)$$

where $a_j=1+p+c_j^2$, $j \in \{1, 2, \ldots, N\}$. The last two terms of equation (17) are in the quadratic form of the matrix, as in (18).

$$Q = \begin{pmatrix} a_1 & -\xi_{12} & \cdots & -\xi_{1N} \\ -\xi_{21} & a_2 & \cdots & -\xi_{2N} \\ \vdots & \vdots & \ddots & \vdots \\ -\xi_{N1} & -\xi_{N2} & \cdots & a_N \end{pmatrix} \quad (18)$$

If Q is positive-definite, then $s_j=0$, $\forall j \in \{1, 2, \ldots, N\}$ is the solution to equations (12), (13). More importantly, this solution can also be approached by the system starting from certain initial conditions. Since the dynamics of the in-phase components are primarily affected by the square of the quadrature components, the local behavior of the in-phase and the quadrature components can be separated. The corresponding Jacobian matrix for the quadrature components is $J_s=Q$, thus steady states with all quadrature components being 0 are stable.

The smallest eigenvalue of Q is still unknown without solving equations (12), (13) to obtain the steady state values of in-phase components. However, a lower bound could be evaluated when Q is hermitian. Q is decomposed as the sum of two hermitian matrices D and G, where D is shown in (19).

$$D = \begin{pmatrix} a_1 & 0 & \cdots & 0 \\ 0 & a_2 & \cdots & 0 \\ \vdots & \vdots & \ddots & \vdots \\ 0 & 0 & \cdots & a_N \end{pmatrix} \quad (19)$$

From Weyl's theorem, the eigenvalues $\lambda(Q)$ are bounded by $$\lambda_{min}(G) + \min_j a_j \leq \lambda(Q) \leq \max_j a_j + \lambda_{max}(G) \quad (20)$$

Since $\lambda_{min}(G)<0$, a sufficient condition for Q to be positive-definite is as shown in (21).

$$|\lambda_{min}(G)| < 1 + p \leq \min_j a_j \quad (21)$$

The conditions in equation (16) and equation (21) establish guidelines for choosing the appropriate combination of the normalized pump rate p and the coupling strength $\xi_{jl}$ to allow each degenerate OPO to represent a binary digit in the network. Yet, it is noteworthy that because of the sufficient nature of equation (21), there are exceptions to these conditions.

Overall Photon Decay Rate

The term $p-(c_j^2+s_j^2)$ in equations (10), (11) denotes the saturated gain for the j-th degenerate OPO. At the steady state, the total saturated gain of the whole network equals to the overall photon decay rate $\Gamma$ such that:

$$\Gamma = \sum_{j=1}^{N} (p - (c_j^2 + s_j^2)) \quad (22)$$

It is expected that the N coupled degenerate OPO network would oscillate in the mode with minimum $\Gamma$ photon decay rate due to the gain saturation effect.

Suppose that the quadrature components are 0 for all of the degenerate OPOs. When the degenerate OPOs are merely weakly coupled to each other, the in-phase component $c_j$ that satisfies equations (12), (13) can be expressed in the formal expansion shown in (23) according to the perturbation theory.

$$c_j = c_j^{(0)} + \in c_j^{(1)} + \in^2 c_j^{(2)} + \ldots \quad (23)$$

where $\in = \max_{1\leq j,l\leq N} |\xi_{jl}|$. Each term $c_j^{(n)}$, $n \geq 0$ in (22) can be obtained by substituting the above expansion to equations (12), (13) and setting the coefficient of the $\in^n$ term to be 0. The 0-th order term $c_j^{(0)}=\pm\sqrt{p-1}$ is the signal amplitude when there is no mutual coupling. The validity of the above expansion for $c_j$ indicates that the mutual coupling terms are weak enough to change the phase of the signal field so that $\sigma_j=\text{sgn}(c_j^{(0)})$ is the Ising spin value that the j-th degenerate OPO represents. The overall photon decay rate is, then, as shown in (24).

$$\Gamma = N - \sum_{1 \leq j \neq l \leq N} \xi_{jl}\sigma_j\sigma_l + O\left(\frac{\epsilon^3 N^4}{(p-1)^3}\right) \quad (24)$$

The upper bound is evaluated for the case when coupling of the same strength exists between any two of the degenerate OPOs. Therefore, the phase configuration of the network with minimum $\Gamma$ corresponds to the ground state of the Ising Hamiltonian for sufficiently weak mutual coupling.

To examine the above-mentioned gain principle, the dynamic behavior of two coupled degenerate OPOs was studied. Under the requirement in equation (21), the quadrature components of the system are 0 at steady states. The relative simplicity of the system makes possible the analytic solution for the in-phase components and the investigation of linear stability of these steady states. Some results are summarized in Table 1.

TABLE 1

| p | $\xi$ | (0, 0) | $(c_g, c_g)$ | $(c_u, -c_u)$ | $(c_g, c_a)$ |
|---|---|---|---|---|---|
| p ≤ 1 | (1 − p, 1 + p) | unstable | stable | NA | NA |
| | (p − 1, 1 − p) | stable | NA | NA | NA |
| | (−1 − p, p − 1) | unstable | NA | stable | NA |
| p > 1 | (p − 1, p + 1) | unstable | stable | NA | NA |
| | $\left(\frac{p-1}{2}, p-1\right)$ | unstable | stable | unstable | NA |
| | $\left(-\frac{p-1}{2}, \frac{p-1}{2}\right)$ | unstable | stable | stable | unstable |
| | $\left(1-p, -\frac{p-1}{2}\right)$ | unstable | unstable | stable | NA |
| | (−1 − p, 1 − p) | unstable | NA | stable | NA |

In Table 1, note that $\xi$ is the coupling strength between the two degenerate OPOs, and NA means the corresponding steady state does not exist.

When the system has one and only one stable steady state, this steady state is approachable from any initial state due to the noise associated in the oscillation build-up. When $$\xi \in \left(\frac{p-1}{2}, 1+p\right),$$

two degenerate OPOs would have the same amplitude and phase at the steady state; whereas when $$\xi_{12} \in \left(-(1+p), \frac{p-1}{2}\right),$$

they would have the same amplitude but opposite phases. Based upon the spin assignment to each of the degenerate OPOs discussed in the steady state analysis section above, the steady states of the system are exactly mapped onto the ground states of the Ising Hamiltonian.

Figure 7A:
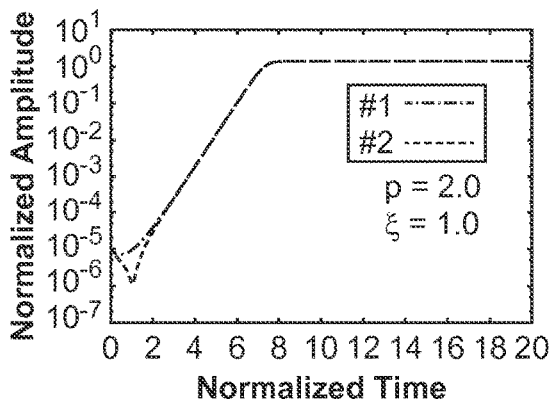
FIGS. 7A, 7B illustrate a numerical simulation of finding a solution using a computational machine.
Figure 7B:
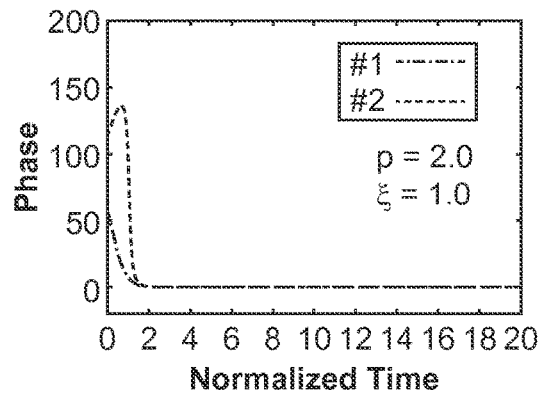

FIGS. 7A, 7B illustrate how a system, starting from random initial phases, finds a ground state of two spins with ferromagnetic coupling in the Ising model. However, when the system has more than one stable steady state, the system would approach to one of them based upon the initial conditions.

Figure 7C:
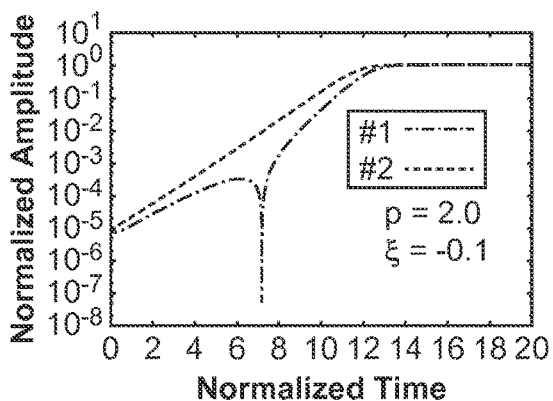
FIGS. 7C, 7D illustrate a numerical simulation of finding a solution using a computational machine.
Figure 7D:
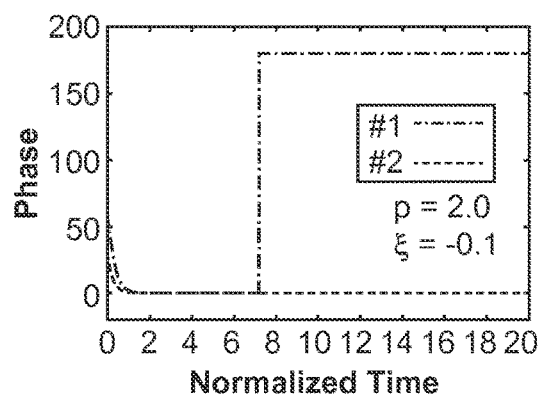

FIGS. 7C, 7D show that for some initial phases the system evolves to a steady state corresponding to a ground state of the Ising Hamiltonian.

Figure 7E:
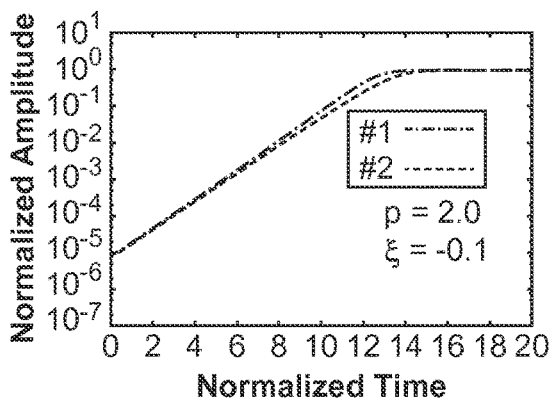
FIGS. 7E, 7F illustrate a numerical simulation of finding a solution using a computational machine.
Figure 7F:
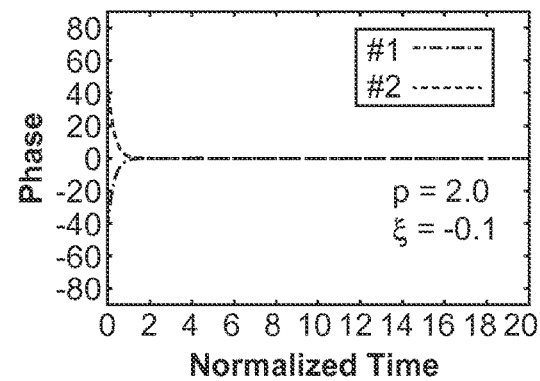

FIGS. 7E, 7F show that for some other initial phases the system evolves to a steady state corresponding to an excited state of the Ising Hamiltonian. The amplitudes of the degenerate OPOs are larger in the former case, as expected.

The critical point at which the system might evolve to an excited state of the Ising Hamiltonian is $$|\xi| = \frac{p-1}{2}$$

according to Table 1. In the limit that no coupling exists, since each degenerate OPO can choose either 0 or $\pi$ phase independently, the ground states and the excited states are equally likely. Hence, when $|\xi|$ becomes smaller, the success probability of the system finding a ground state of two coupled spins is expected to asymptotically approach to 0.5.

Figure 8A:
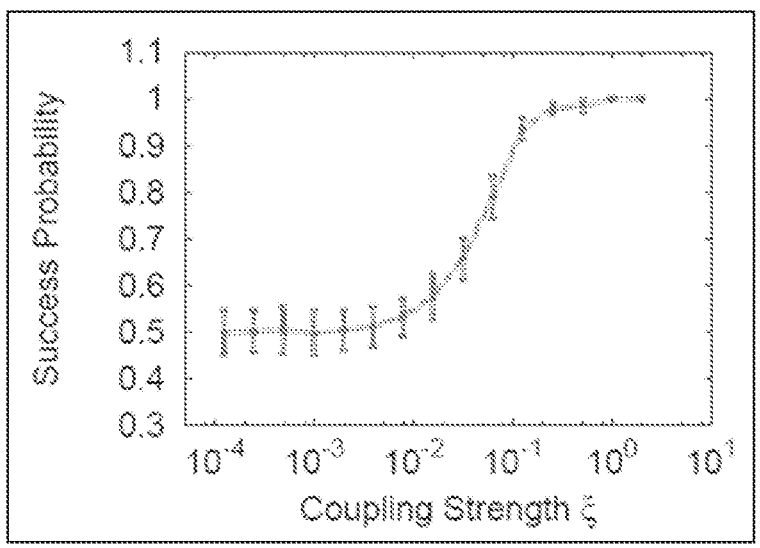
FIG. 8A illustrates a numerical estimation of success probability's dependence on coupling strength between degenerate OPOs.

FIG. 8A illustrates the success probability's dependence on a positive coupling strength between two degenerate OPOs when p=2.0. For each value of the coupling strength, the statistics of the steady states approached by the system starting from 100 groups of 100 pairs of random initial phases are used to calculate the success probability and the standard deviation. The success probability in this example is always above 0.5. Moreover, the ground state spin configuration does not change if the coupling strengths are scaled by the same positive factor. Thus, the efficiency of the system to find a ground state can be improved by scaling $\xi$ properly.

Evaluation Using NP-Hard MAX-CUT Problem, N=3

The performance of coupled degenerate OPO networks as Ising machines can be evaluated on a restricted set of instances in the Ising model. In these instances, each spin couples to three others with anti-ferromagnetic coupling of identical strength $\xi$. Finding the ground state of these instances is equivalent to findING the maximum cut on unweighted cubic graphs. The MAX-CUT problem is one of the early known NP-hard combinatorial optimization problems. For a graph G=(V, E), where V and E are the sets of nodes and edges, a cut S is a subset of V. Assign $\sigma_j=+1$ to the j-th node if it is in S and $\sigma_j=-1$ if not. When the weight of the edge connecting the j-th and the l-th node is $-\xi_{jl}$, the weight of cut S is given by $\omega(s)$ as shown in (25).

$$\omega(S) = -\sum_{j \in S, l \in V \setminus S} \xi_{jl} = -\frac{1}{4}\sum_{j,l \in V} \xi_{jl} + \frac{1}{4}\sum_{j,l \in V} \xi_{jl}\sigma_j\sigma_l \quad (25)$$

Hence, the Ising Hamiltonian in the above equation is minimized when the weight of cut S is maximized. Meanwhile, the MAX-CUT problem restricted to unweighted cubic graphs is still NP-hard. Scaling all the edge weights by the same positive factor does not change the nature of the problem. Hence, even under the restrictions on the number of couplings with other spins and the strength of the coupling, as long as $\xi<0$, computationally hard instances in the Ising model are still included. Therefore, the ability of the system FOR solving instances in the restricted set provides an appropriate benchmark for its performance as an Ising machine.

The spin configurations of the Ising model with N spins are obtained from the steady states of the corresponding coupled degenerate OPO network by solving the classical dynamic equations (10), (11) under different initial conditions. The initial normalized amplitudes of the degenerate OPOs are set to be $10^{-5}$, whereas the initial phases are randomly chosen as N different numbers to simulate the quantum noise associated with the parametric spontaneous down conversion during the oscillation build-up. In a realistic experimental setup, a portion of the signal from one degenerate OPO can be injected to the others. Set the coupling strength $\xi=-0.1$ to represent a 26 dB loss. For an instance of the Ising model in the restricted set, the hermitian matrix G in equation (15) is the product of $-\xi$ and the adjacency matrix of the associated cubic graph G'. Since the absolute values of the eigenvalues of G' are upper bounded by 3, the condition in equation (15) is satisfied for any normalized pump rate p>1. Set p=1.1 to guarantee the above threshold oscillation of the network required in equation (16). Then, for the choice of p and $\xi$, every approached steady state of the system can be mapped onto a spin configuration of the Ising model.

The number of instances of the Ising model in the restricted set is equal to the number of cubic graphs. Table 2 lists the total number of cubic graphs with order N=4 to 20. Due to the small input size of the instances, the ground states of the Ising Hamiltonian in equation (1) can be obtained by examining all the possible combinations by brute force. Then, the success probability of solving equations (10), (11) to find the ground states of the Ising Hamiltonian can be evaluated.

TABLE 2

| Order | 4 | 6 | 8 | 10 | 12 | 14 | 16 | 18 | 20 |
|---|---|---|---|---|---|---|---|---|---|
| Cubic Graphs | 1 | 2 | 5 | 19 | 85 | 509 | 4060 | 41301 | 510489 |

Figure 8B:
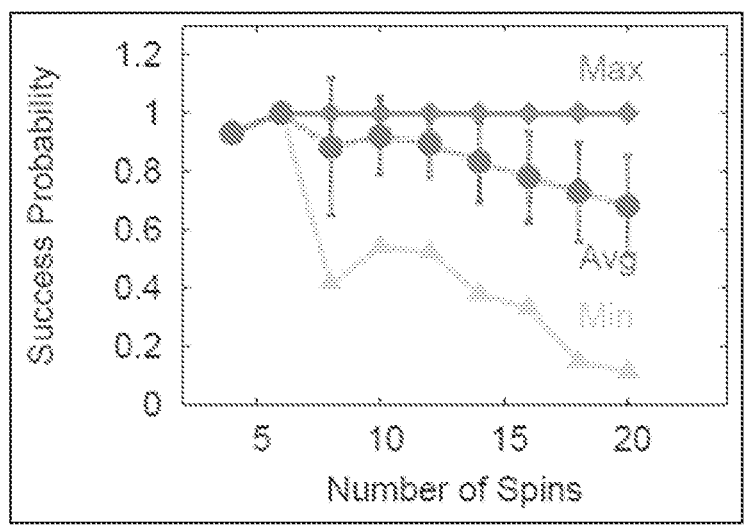
FIG. 8B illustrates a numerical estimation of success probability of finding ground states of the Ising Hamiltonian as a function of the number of spins.

FIG. 8b illustrates the maximum, minimum, and average success probability of finding the ground states of the Ising Hamiltonian as a function of the number of spins when p=1.1 and $\xi=-0.1$ over instances with the same number of spins. The average and the worst-case success probabilities are above 60% and 10%, respectively, at N=20.

Since all simulations reach to the steady state in 200 normalized time, the trend of the computation time for the system to find the ground states of the Ising Hamiltonian can be estimated using the worst-case success probability q. The number of iterations required to boost the success probability for all instances better than $(1-\in)>q$ is given by (26).

$$m > \frac{\ln(\epsilon)}{\ln(1-q)} \quad (26)$$

Figure 9:
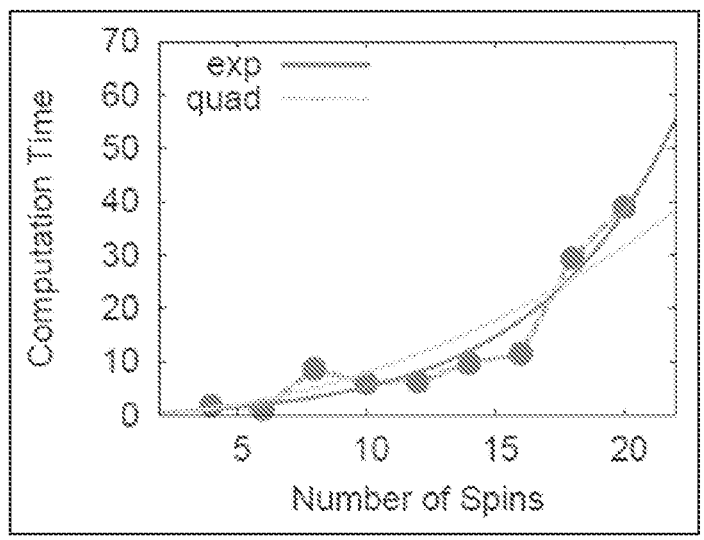
FIG. 9 illustrates numerical estimation of computation time dependence on the number of spins.

FIG. 9 illustrates computation time dependence on the number of spins as defined by the above equation, when the error rate $\in=1\%$. When N changes from 10 to 20, the computation time increases by about 8 times, much less than an exponential upsurge expected in a brute force search for the ground states.

In summary, the above theoretical investigation and numerical simulation demonstrate the potential for implementing the NP-hard Ising model on a coupled degenerate OPO network. Two properties of the network are: the binary output phase of each degenerate OPO makes it possible to represent an Ising spin; and the minimum gain principle is that the oscillation mode of the system is likely to be the one with minimum overall photon decay rate at the steady state. Under weak mutual coupling among the degenerate OPOs, it has been shown that the mode with minimum overall photon decay rate corresponds to the ground spin configuration of the Ising model. For arbitrary coupling strength, preliminary numerical simulations on instances in the Ising model that are equivalent to NP-hard MAX-CUT problems have demonstrated promising results for utilizing the system as an Ising machine.

The results further show the possibility of a new classical heuristic technique which solves the NP-hard Ising model using a set of nonlinear differential equations.

Additional Experimental and Simulation Results

The following includes additional description and results, both experimental and simulation. A portion of the additional description is summarized or restated from above, providing context for the reported results.

The Ising model is a mathematical abstraction of spin glasses composed of frustrated spins which possess peculiar properties such as spin freezing, cusp in magnetic susceptibility, remanence, and hysteresis. The Ising model also serves as a cost function for various combinatorial optimization problems in biology, medicine, wireless communications, artificial intelligence, and social network. These problems are commonly believed to be intractable in computer science, and so far no efficient classical and quantum technique is known for solving them. This disclosure describes a novel computing machine based on non-equilibrium phase transition exhibited by a coherent network of degenerate OPOs, which is efficient in solving Ising problems and other computationally difficult problems. When the network is gradually pumped from below to above the oscillation threshold, it oscillates either in one of the ground states of the Ising Hamiltonian which have the minimum photon loss rate, or in low excess energy excited states which have slightly higher photon loss rates. The network may be realized in one implementation in a single OPO ring cavity with multiple trains of pulses (e.g., femtosecond pulses) and configurable mutual couplings; spins are represented with above-threshold binary phases of the OPO pulses. The smallest nondeterministic polynomial time (NP)-hard Ising problem was programmed on the machine, and in 1000 runs of the machine no computational error was detected.

Many important combinatorial optimization problems belong to the NP-hard or NP-complete classes, and solving them efficiently has been beyond the reach of classical and computational machines. Simulated annealing and various approximate techniques, as well as quantum annealing and adiabatic quantum computation, have been studied for solving NP problems. However, as these computations are limited in their ability, the quest for an efficient computing machine to solve large-scale NP-hard problems has continued. A coherent network of time-division-multiplexed degenerate OPOs provides such an efficient computing machine.

As described above in equation (1), reproduced here, the Hamiltonian H of an Ising model with N spins and without an external field is given by:

$$H = -\sum_{ij}^{N} J_{ij}\sigma_i\sigma_j \quad (1)$$

where $J_{ij}$ is the coupling between the $i^{th}$ and $j^{th}$ spins, and $\sigma_i$ and $\sigma_j$ representing the z-projections of the spins, the eigenvalues of which are either +1 or −1. To implement an artificial Ising spin system, elements with binary degrees of freedom and configurable couplings are used.

Figure 10A:
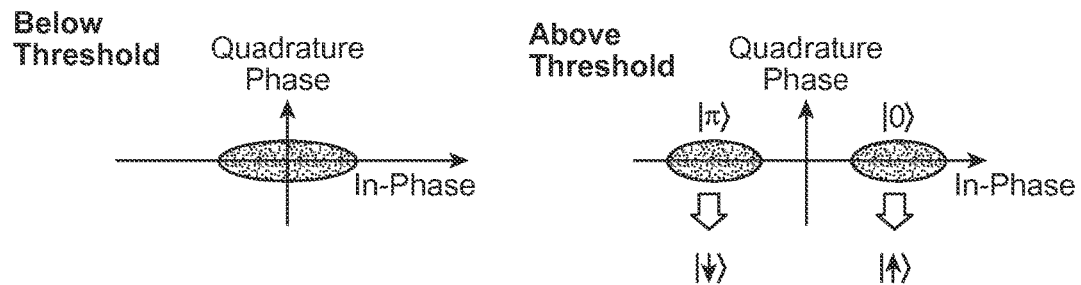
FIG. 10A illustrates below threshold and above threshold behavior of an OPO.
Figure 10B:
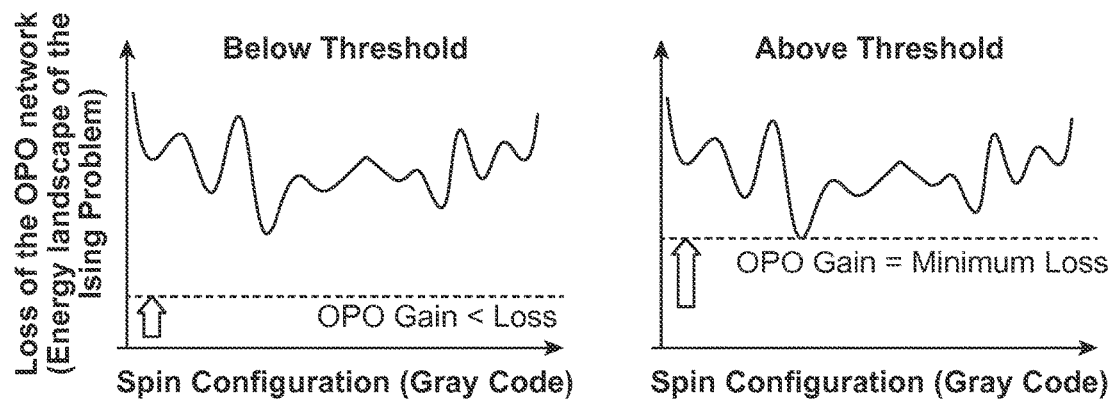
FIG. 10B illustrates gradual pumping of the OPO network to find ground states, and illustrates that different spin configurations (phase states) have different total photon losses in a network.
Figure 10C:
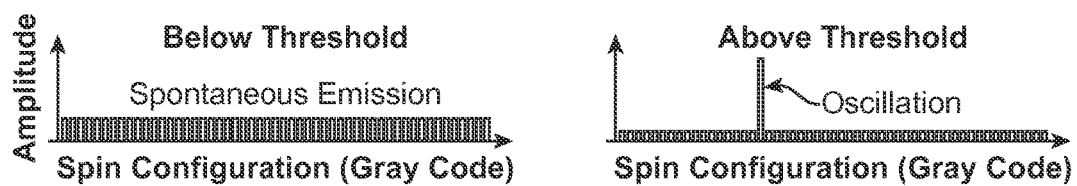
FIG. 10C illustrates that the spin configuration corresponding to the ground state of the Ising problem is expected to oscillate above threshold.

Degenerate OPOs are suitable to represent Ising spins because of binary phase operation above threshold. FIG. 10A illustrates the operation of a degenerate OPO for below and above oscillation threshold in the in-phase and quadrature-phase coordinates. Below the threshold, the signal field is a squeezed vacuum state, and by increasing the pump field it undergoes spontaneous symmetry breaking around the oscillation threshold. Gradual pumping of the OPO network is used to find the ground states (as indicated in FIG. 10B). The non-equilibrium phase transition leads to oscillation in one of the two phase states ($|0\rangle$ or $|\pi\rangle$), which are exploited to represent an Ising spin ($\sigma_z$). The couplings between the spins ($J_{ij}$) are realized by mutual injections of the signal fields of the $i^{th}$ and $i^{th}$ OPOs. The resulting OPO network has a phase-state dependent photon decay rate corresponding to the energy landscape of the original Ising Hamiltonian; different spin configurations (phase states) have different total photon losses in the network, which is illustrated in FIG. 10C.

The search for the ground states is conducted by gradually raising the gain via increasing the pump field. As the parametric gain approaches the lowest possible loss, the network goes through the OPO phase transition, and as a result it is expected to oscillate in one of the exact or approximate ground states. Further increase in the pump pins the gain to the threshold value and thus erroneous oscillation in the excited states continues to be suppressed. The computational power of the OPO network resides in the transition from below to above the oscillation threshold. Although the below or above-threshold behavior of an OPO network can be simulated on a classical computer, no efficient technique is yet known for comprehensive simulation of the phase transition point. This disclosure describes a numerical model using c-number Langevin equations, which are compatible with fundamental quantum mechanical master equations or Fokker-Planck equations, and the simulation results promise effectiveness of OPO networks in solving relatively large MAX-CUT problems and other difficult problems.

Figure 11A:
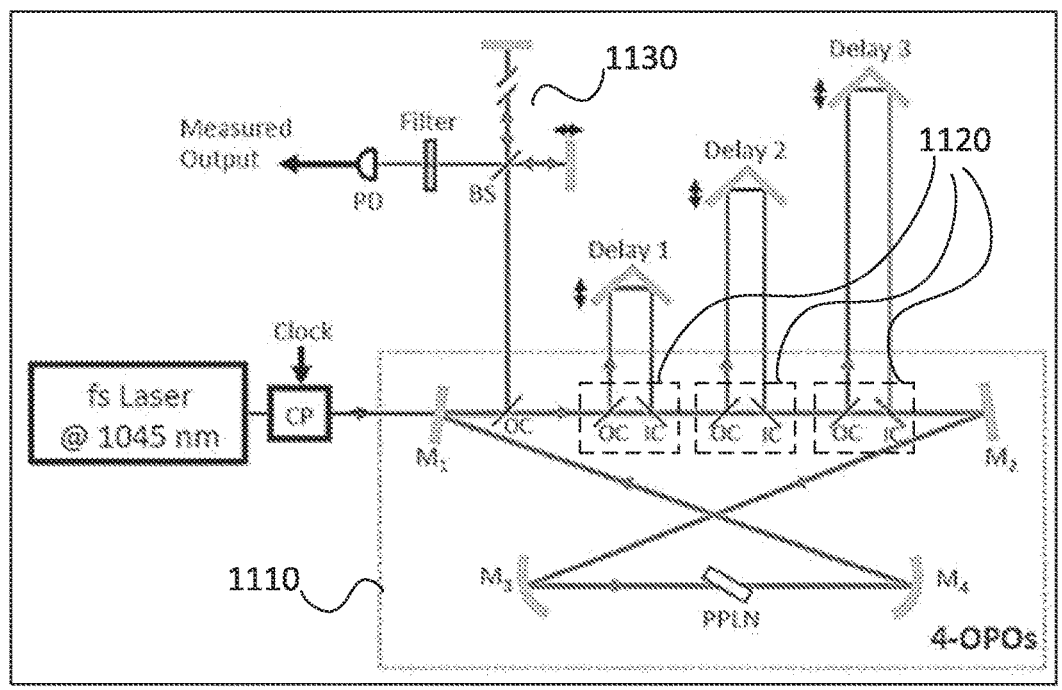
FIG. 11A illustrates an experimental setup.
Figure 11B:
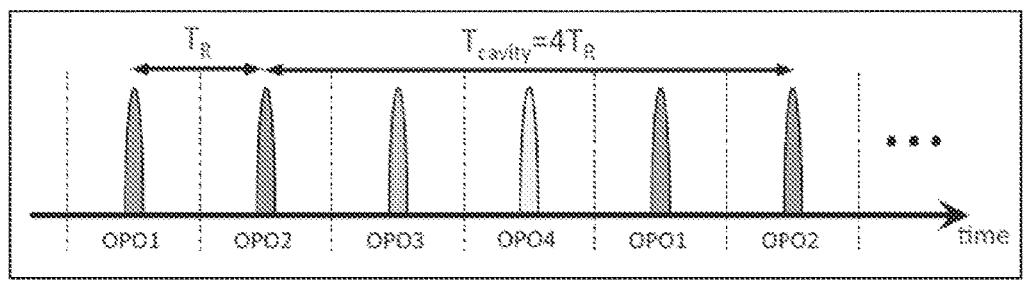
FIG. 11B illustrates that the ring resonator of FIG. 11A has a roundtrip time of four times the pump pulse repetition period.
Figure 11C:
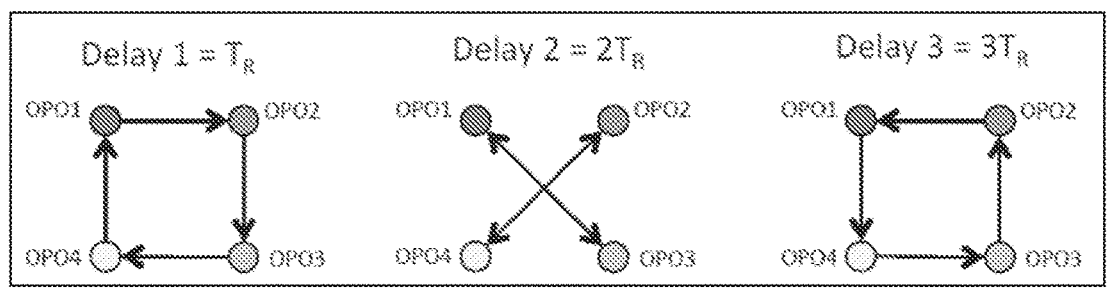
FIG. 11C illustrates coupling provided by the delays in the setup of FIG. 11A.

For an experiment, time-division-multiplexing was used, in which a single ring resonator 1110 simulates many Ising spins simultaneously, free from mismatch and phase decoherence noise. FIG. 11A illustrates the experimental setup using a 4-OPO system. Ring resonator 1110 has a roundtrip time ($T_{cavity}$) of four times the pump pulse repetition period ($T_R$), as shown in FIG. 11B, and therefore the pulses represent four temporally separated independent OPOs. The couplings between these independent but identical OPOs are realized using three pairs of output and input couplers (OC/IC pairs 1120, as shown in FIG. 11A) in the resonator paths. In each OC/IC pair, approximately 4% of the intracavity power is out-coupled and delayed in a free-space delay line; each delay is an integer multiple of the repetition period, and approximately 4% of the out-coupled light is injected back to the resonator. This corresponds to approximately 4% of field coupling between the OPOs. FIG. 11C depicts how the delay lines provide all the possible couplings ($J_{ij}$) among the four temporally separated OPOs. Each delay line provides four couplings, i.e. two-body interactions, among the temporally separated OPOs. Delay 1 couples $OPO_n$ to $OPO_{n+1}$ ($J_{12}, J_{23}, J_{34}, J_{41}$), delay 2 couples $OPO_n$ to $OPO_{n+2}$ ($J_{13}, J_{24}, J_{31}, J_{42}$), and delay 3 couples $OPO_n$ to $OPO_{n+3}$ ($J_{14}, J_{21}, J_{32}, J_{43}$).

In this experimental setup, the output was sent to a one-bit delay Michelson interferometer 1130 to measure the phase states of the 4-OPO system, as shown in FIG. 11A. The delay difference of the arms is locked to the repetition period of the system ($T_R$). Therefore, the interferometer measures the differential phase between adjacent OPOs, such that the output is the interference of $OPO_n$ and $OPO_{n+1}$, and n changes with the time slot of measurement. Fast and slow detectors were used at the output of the interferometer.

The 4-OPO system in the experimental setup was pumped with a femtosecond mode locked laser with a central wavelength of 1045 nm, at a repetition period of 4 ns. The pump field was gradually increased from below the oscillation threshold to about two times the oscillation threshold over a time of approximately 180 µs, while the cavity photon lifetime is approximately 60 ns.

Figure 12B:
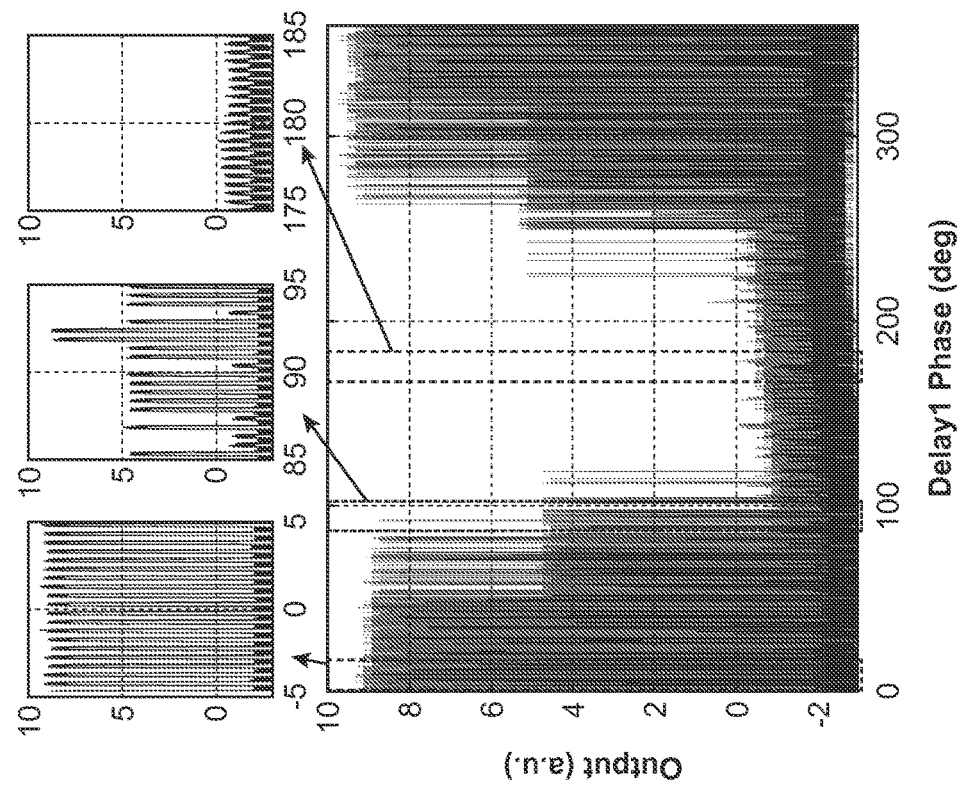
FIG. 12B illustrates some test results with one delay line unblocked in the setup of FIG. 11A.
Figure 12A:
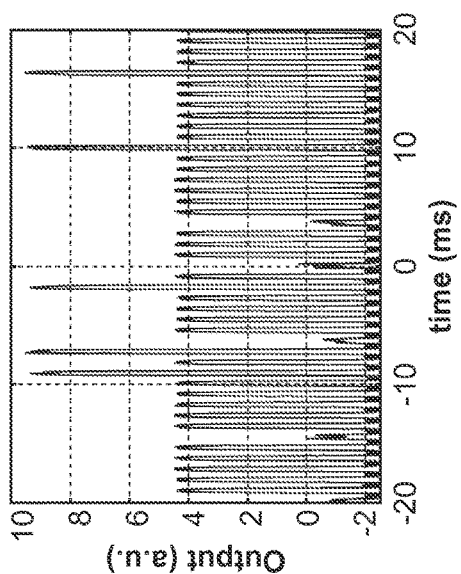
FIG. 12A illustrates some test results with all delay lines blocked in the setup of FIG. 11A.
Figure 12C:
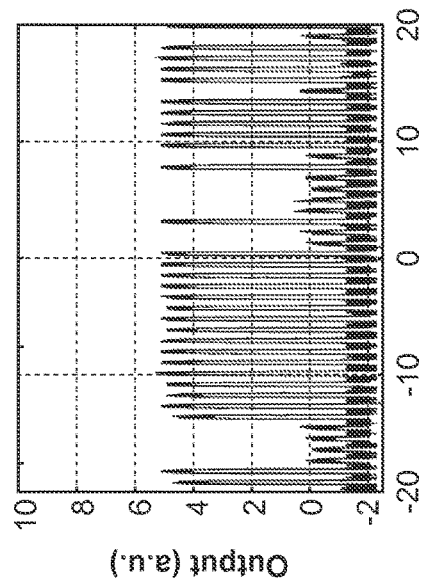
FIG. 12C illustrates some test results with all delay lines unblocked in the setup of FIG. 11A.

FIGS. 12A-C present plots from the slow detector output. When the couplings are blocked, the OPOs are expected to operate independently, and therefore a random uniformly distributed selection of the phase states are expected each time the OPO is restarted. The output toggles between the three distinct intensity levels (0, $I_m/2$, and $I_m$). Assuming all the states are equally probable to occur, $I_m/2$ corresponds to 12 phase states and $I_m$, and 0 correspond to 2 different phase states, for a ratio of 6:1:1. As seen by the plot in FIG. 12A for all couplings blocked, the frequencies of occurrence of the 0, $I_m/2$, and $I_m$, events are 6:1:1.

Having in-phase (or out-of-phase) couplings among the adjacent OPOs corresponds to ferromagnetic (or antiferromagnetic) couplings in an Ising spin ring with the expected outcome of aligned (or anti-aligned) spins. In the experiment, the shortest delay line was set to in-phase (or out-of-phase) coupling, and the other delay lines blocked. For the in-phase case, the OPOs operated at the same phase states, whereas for the out-of-phase case, the OPOs operated in alternating states. FIG. 12B illustrates the shortest delay line being swept through 360 degrees of phase with the other delay lines blocked. The sweeping speed is slow compared with the 1 kHz restarting frequency of the OPOs. The output of the slow detector is at $I_m$ when the phase of delay 1 is around zero ($\angle J_{12}=\phi J_{23}=\angle J_{34}=\phi J_{41}\cong 0$). This corresponds to $|0000\rangle$) or $|\pi\pi\pi\pi\rangle$) phase states, confirming that in-phase coupling between $OPO_n$ and $OPO_{n+1}$ leads to all OPOs oscillating in the same phase state. When the phase of delay 1 is around 180°, such that the field of $OPO_n$ is shifted by π and injected to $OPO_{n+1}$, the output intensity remains at 0 level, meaning that the OPOs are either in $|0\pi 0\pi\rangle$ or $|\pi 0\pi 0\rangle$). As indicated in FIG. 12B, the coupled OPOs tolerate a coupling phase deviation of at least ±30° around in-phase or out-of-phase couplings. This regenerative behavior is due to the phase sensitive nature of the parametric gain in the degenerate OPO and makes the system nearly immune to the phase noise in the environment. Similar behavior was observed for the other delay lines.

The experimental setup was used to implement an NP-hard MAX-CUT problem, which is mapped to an Ising problem and corresponds to a frustrated Ising spin system. The problem is to find a subset of vertices in a cubic graph, in which all vertices have three edges, such that the number of edges between the subset and its complementary subset is maximized. For a cubic graph with 4 vertices, which has 6 edges, any subset choice with two vertices is an answer of the MAX-CUT problem (or MAX-2-SAT problem), and any other subset choice is not. To program this problem on the OPO Ising machine, the mutual couplings between the OPOs were set to out-of-phase (i.e. $J_{ij}<0$). The total photon decay rate of the network is lowest for the answers of the MAX-CUT problem corresponding to two OPOs in $|0\rangle$ and two OPOs in $|\pi\rangle$, hence upon each gradual pumping the 4-OPO network is expected to oscillate in such a phase state. The phases of the three delays were locked to $\pi$ using the residual pump interference signal at the transmission port of the input couplers. A plot of the interferometer output is shown in FIG. 12C. It matches the expected outcome of being either $I_m/2$ or 0 with the rate of $I_m/2$ twice the rate of 0. However, since $I_m/2$ corresponds to both answer and non-answer states, it is necessary to use a fast detector to confirm that the non-answer states do not occur.

When a fast detector was used at the interferometer output with all of the couplings blocked, one of the four possible pulse patterns was detected after the 4-OPO system was turned on, as shown in FIG. 13A. Each time the system was pumped above threshold, depending on the network configuration, one of the four patterns was detected at the output of the interferometer using the fast detector. In these patterns, the pulses are separated by 4 ns, which is the repetition period of the pump, and each pulse has either a low or a high intensity corresponding to destructive or constructive interference of the consecutive OPOs, respectively. The low-level pulses are non-zero because of the diffraction mismatch of the interferometer arms. For the case of no coupling, the 4-OPO system was restarted 1000 times. A histogram of the eight phase states entered is shown in FIG. 13B. For each restart, the pulse train was detected and the corresponding phase state was inferred. The result indicates uniform distribution of the phase states, confirming that four temporally separated OPOs are operating independently in the same resonator.

To verify that the OPO network is capable of solving the NP-hard MAX-CUT problem, the histogram of the OPO states is measured for the case of all the delays locked to the phase of pi for 1000 trials. The OPO network represents the MAX-CUT problem for a 4-vertex graph, and it only oscillates in the phase states corresponding to the answers of this problem. The result is depicted in FIG. 13C. No excited phase state is detected, and the distribution of the answer states is close to uniform. The error rate of computation is less than $10^{-3}$ which is limited by the length of measurements.

In FIGS. 13B, 13C, each phase state on the horizontal axis represents two complementary states, for example $|0000\rangle$) and $|\pi\pi\pi\pi\rangle$, because the pulse trains of the interferometer output are the same for such phase states. No time reference is used in the measurements, and only the pattern of the pulses are used to infer the phase states: the measured entries for $|0\pi00\rangle$, $|00\pi0\rangle$, $|000\pi\rangle$, and $|\pi000\rangle$ are the same and equal to the number of measured [1100] patterns divided by 4. Likewise, the entries for $|0\pi\pi0\rangle$ and $|00\pi\pi\rangle$ are the number of [1010] patterns divided by 2.

Thus, a coherent network of time-division-multiplexed degenerate OPOs is capable of solving the NP-hard MAX-CUT problem for N=4. The practical scalability enabled by multi-pulse operation in a long fiber-based ring cavity, simple mapping of the OPO bi-stable phase states to the Ising spin, and intriguing quantum phase transition at the threshold can make the OPO network suitable for obtaining approximate solutions for large-scale NP-hard Ising problems with reasonable accuracy and speed. Time division multiplexing enables increasing the size of the network by increasing the cavity round-trip time ($T_{cavity}=NT_R$), and implementing N−1 delay lines, with each delay corresponding to one coupling at a given time slot. To program a large-scale machine to arbitrary Ising problems, intensity modulators are used to turn on and off each delay, and phase modulators used to choose either in-phase or out-of-phase couplings. Exploiting optical fiber technologies and planar light wave circuits can enable implementation of compact large Ising machines.

Figure 14:
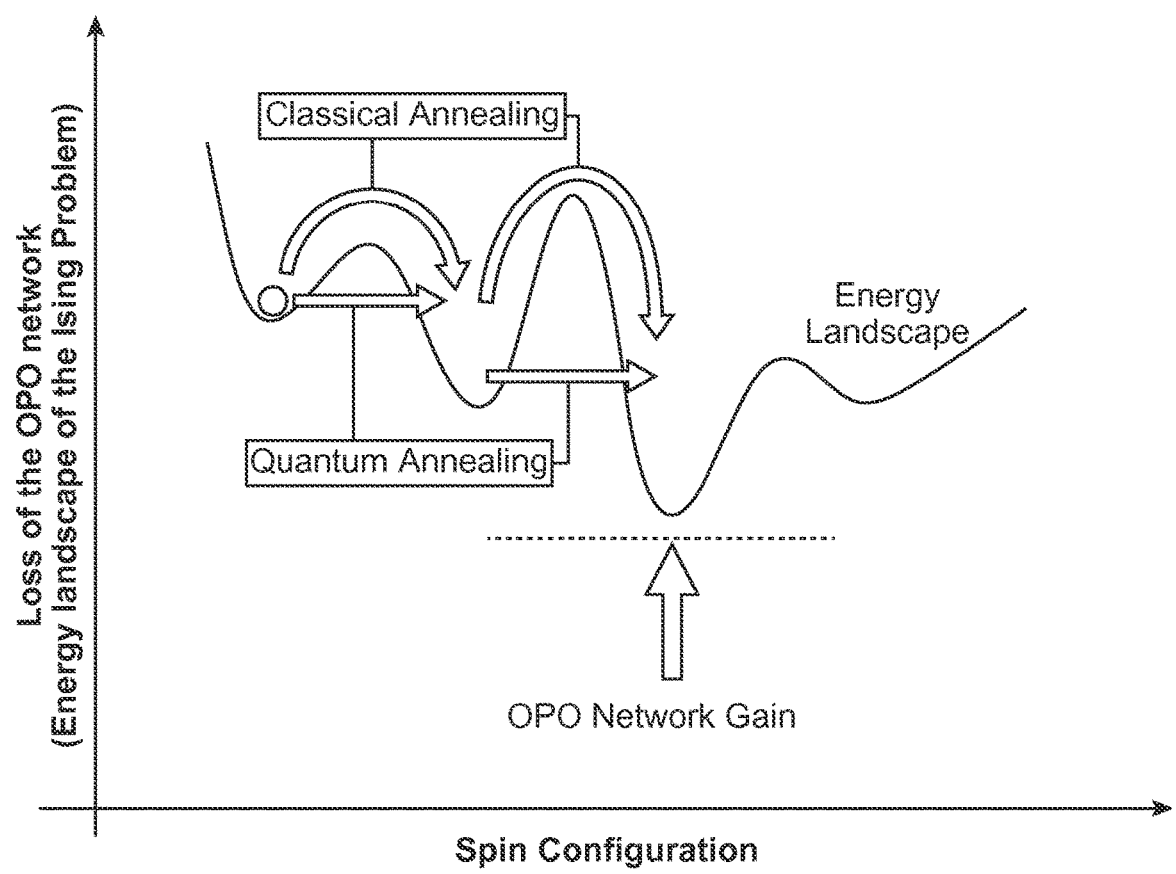
FIG. 14 illustrates a comparison of classical and quantum mechanical annealing techniques to the technique described in this disclosure.

The computational concept of this disclosure is compared with classical and quantum annealing techniques in the illustration in FIG. 14, which illustrates the challenge in classical annealing to go from a metastable excited state to the ground state through multiple thermal hopping states, or the challenge in quantum annealing to go through quantum mechanical tunneling through many metastable states. Classical simulated annealing employs a downward vertical search, in which the temperature is repeatedly decreased and increased until the ground state is found. Quantum annealing exerts a horizontal search in the energy landscape with quantum tunneling. Therefore, with these methods, the computational time of finding the ground state increases with the increase in the number of metastable excited states or local minima.

In contrast, the OPO-based Ising machine searches for the ground state in an upward direction. The total energy (i.e., the ordinate in FIG. 14) is now replaced by the network loss. The optimum solution ground state has a minimum loss. A parametric gain 'G' is included into the network and increased gradually, and the first touch to the network loss happens at the ground state, which results in the single-mode oscillation of the ground state spin configuration. At a pump rate above this threshold point, the parametric gain is clamped at the same value of $G=L_{min}$ due to nonlinear gain saturation, so that the other modes including local minima stay under the oscillation threshold. If we use the terminology of "negative temperature" to represent the parametric gain, the mentioned upward search corresponds to the heating process from $T=-\infty$ for zero gain toward $T=-0$ for high gain. In this sense, the OPO machine is a "heating machine" while the classical simulated annealing is a "cooling machine." Since there is no structure below the ground state, as shown in FIG. 14, the heating machine has some advantage over the cooling machine, and can be less susceptible to being trapped in the metastable excited states of an Ising problem.

To simulate a network of N degenerate OPOs, the quantum mechanical Fokker-Planck equation (Q-FPE) for a single OPO using the generalized P-representation is used as a starting point, as shown in equation (27).

$$\frac{d}{dt}P(a_s, b_s) = \tag{27}$$
$$\left\{\frac{\partial}{\partial a_s}[a_s - (p-a_s^2)b_s] + \frac{\partial}{\partial b_s}[b_s - (p-b_s^2)a_s]\right\}P(a_s, b_s) +$$
$$\frac{1}{2A_s^2}\left[\frac{\partial^2}{\partial a_s^2}(p-a_s^2) + \frac{\partial^2}{\partial b_s^2}(p-b_s^2)\right]P(a_s, b_s)$$

Here $a_s=\alpha_s/A_s$ and $b_s=\beta_s/A_s$ are the normalized eigenvalues for the off-diagonal coherent-state expansion, $|\alpha_s\rangle\langle\beta_s|$, of the density matrix, $\gamma_s$ and $\gamma_p$ are the signal and pump photon decay rates, $A_s=(\gamma_p\gamma_s/2\kappa^2)^{1/2}$ is the oscillation field amplitude at a normalized pump rate $p=F_p/F_{th}=2$, $t=(\gamma_s/2)\tau$ is the normalized time, $F_p$ is the pump field amplitude, $F_{th}=\gamma_p\gamma_s/4\kappa$ is the threshold pump amplitude. The average amplitudes of in-phase and quadrature-phase components of the signal wave are derived by equations (28), (29).

$$\langle A_{s1}\rangle + A_s\langle a_s+b_s\rangle/2 \tag{28}$$

$$\langle A_{s2}\rangle = A_s\langle a_s-b_s\rangle/2i \tag{29}$$

Equation (27) can be cast into the c-number Langevin equation (C-LGE) for the in-phase and quadrature-phase components of the signal field via the Kramers-Moyal expansion, as shown in equations (30), (31).

$$dc = (-1+p-c^2-s^2)cdt + \frac{1}{A_s}\sqrt{c^2+s^2+\frac{1}{2}}\,dW_1 \tag{30}$$

$$ds = (-1-p-c^2-s^2)sdt + \frac{1}{A_s}\sqrt{c^2+s^2+\frac{1}{2}}\,dW_2 \tag{31}$$

In equations (30), (31), $c=\frac{1}{2}(a_s+b_s)$, $s=(\frac{1}{2}i)(a_s-b_s)$, and $dW_1$ and $dW_2$ are two independent Gaussian noise processes which represent the incident vacuum fluctuations at signal frequency $\omega_s$ and pump frequency $\omega_p$, respectively.

The equivalence of the Q-FPE (equation (7)) and C-LGE (equations (30), (31)) can be confirmed by comparing the squeezing and anti-squeezing characteristics of the two quadrature components using equations (32), (33) for the Q-FPE and equations (34), (35) for C-LGE.

$$\langle\Delta A_{s1}^2\rangle = A_s^2[\langle(a_s+b_s)^2\rangle+1]/4-\langle A_{s1}\rangle^2 \tag{32}$$

$$\langle\Delta A_{s2}^2\rangle = -A_s^2[\langle(a_s-b_s)^2\rangle-1]/4-\langle A_{s2}\rangle^2 \tag{33}$$

$$\langle\Delta A_{s1}^2\rangle = A_s^2(\langle c^2\rangle-\langle c\rangle^2) \tag{34}$$

$$\langle\Delta A_{s2}^2\rangle = A_s^2(\langle s^2\rangle-\langle s\rangle^2) \tag{35}$$

The degrees of squeezing and anti-squeezing obtained by the two Q-FPE and C-LGE techniques completely agree at a pump rate across the threshold (p=1).

The Q-FPE and C-LGE for an injection-locked laser oscillator can be extended to the mutually coupled degenerate OPOs using equation (27) or equations (30), (31). The resulting C-LGEs for a network of degenerate OPOs are given by equations (36), (37).

$$\frac{d}{dt}c_j = \left\{[-1+p-(c_j^2+s_j^2)]c_j + \sum_{l=1}^{N}\xi_{jl}c_l\right\}dt + \frac{1}{A_s}\sqrt{c_j^2+s_j^2+1/2}\,dW_{j1} \tag{36}$$

$$\frac{d}{dt}s_j = \left\{[-1-p-(c_j^2+s_j^2)]s_j + \sum_{l=1}^{N}\xi_{jl}c_l\right\}dt + \frac{1}{A_s}\sqrt{c_j^2+s_j^2+1/2}\,dW_{j2} \tag{37}$$

Here, cj and sj are the normalized amplitudes of two quadrature components of the j-th OPO, which corresponds to c and s in equations (30), (31).

Performance of the proposed network of degenerate OPOs as an Ising machine was tested against the NP-hard MAX-CUT problems on cubic graphs for N=4 to N=20 and on random graphs for N=800 to N=20000. For a graph with N vertices, the 2N C-LGEs are solved by the Dormand-Prince method as the differential equation solver, in which adaptive integration strength is introduced by evaluating the local truncation error.

Figure 15:
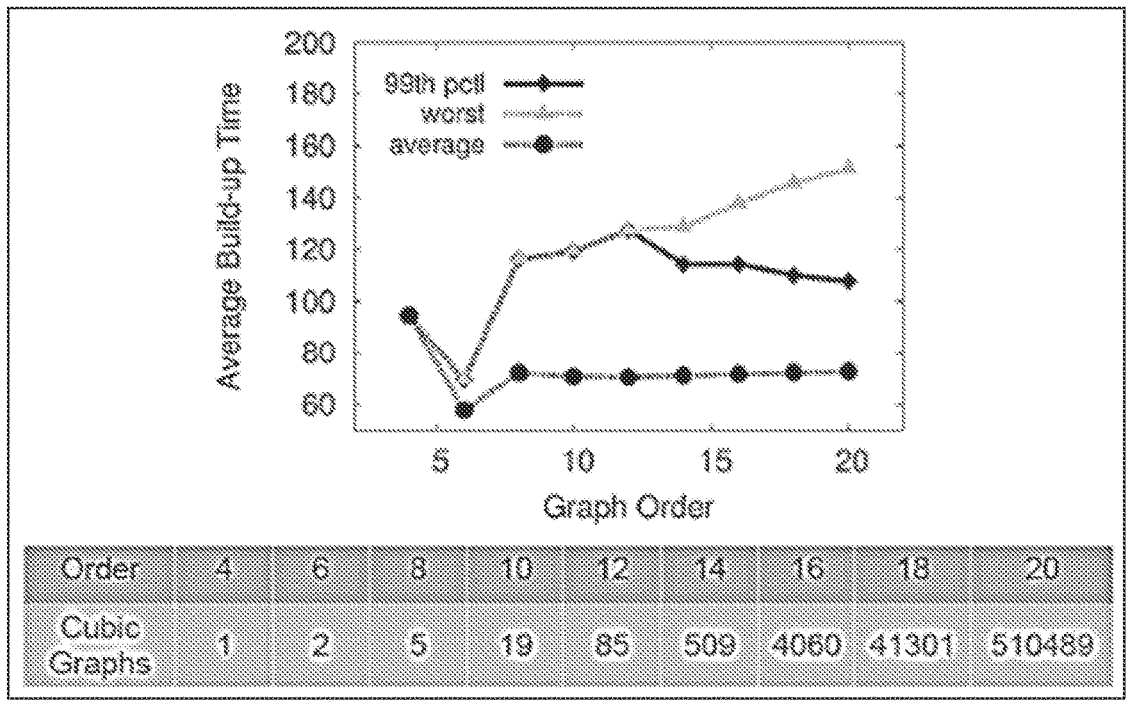
FIG. 15 illustrates normalized build-up time.

FIG. 15 shows the normalized build-up time $t=(\gamma_s/2)\tau$ when the OPO network reaches the steady state oscillation conditions after an above-threshold pump rate (p=1.1) is turned on, versus the graph order N. All graphs were tested: for instance, a total number of 510489 graphs are studied for N=20. Most of the build-up time (up to 99% of all graphs) is independent of the graph order N and is on the order of t≅100, as shown in FIG. 15. Only a slight increase is observed for the worst case as shown by the triangles. Therefore, an actual computational time is determined mainly by the success probability for obtaining a ground state. Since the proposed OPO network is a stochastic machine driven by quantum noise, the success probability is always smaller than one.

Table 3 summarizes performance of the OPO network in solving MAX-CUT problems on cubic graphs. Here, $q_{min}$ denotes the worst-case success probabilities at a fixed pump rate p=1.1 and coupling coefficient $\xi=-0.1$, $p_{opt}$ denotes the optimal pump rate for each worst-case instance, at which the optimum success probability $q_{opt}$ is achieved under the same coupling coefficient $\xi=-0.1$. The success probability at the optimum pump rate for the worst instance is independent of the graph order and ranges from approximately 0.7-1.0.

TABLE 3

| | Order | | | | | | | |
|---|---|---|---|---|---|---|---|---|
| | 4 | 6 | 8 | 10 | 12 | 14 | 16 | 20 |
| $q_{min}$ | 0.93 | 1.00 | 0.41 | 0.54 | 0.52 | 0.37 | 0.33 | 0.11 |
| $p_{opt}$ | 1.05 | 1.30 | 1.30 | 1.30 | 1.00 | 0.85 | 0.85 | 0.82 |
| $q_{opt}$ | 1.00 | 1.00 | 0.70 | 0.74 | 1.00 | 1.00 | 1.00 | 0.74 |

The performance of the OPO network in solving the MAX-CUT problems has also been examined on 71 benchmark instances of the so-called G-set graphs when p=1.1 and $\xi=-0.1$. These instances are randomly constructed by a machine-independent Rinaldi graph generator, with the number of vertices ranging from 800 to 20000, edge density from 0.02% to 6%, and geometry from random, almost planar to toroidal. The outcomes of running the OPO network 100 times for sample G-set graphs are summarized in Table 4. In Table 4, V is the number of vertices in the graph, E is the number of edges, $U_{SDP}$ is the optimal solution to the semidefinite relaxation of the MAX-CUT problem, and T is the average computation time of the OPO network normalized to the cavity photon lifetime. To make comparisons with the Goemans-Williamson algorithm, every cut value O generated from the network is normalized according to $(O+E_{neg})/(U_{SDP}+E_{neg})$, where $E_{neg}\geq0$ is the number of negative edges. $O_{max}$ and $O_{avg}$ are the best and the average values in 100 runs, respectively.

TABLE 4

| Graph | V | E | $U_{SDP}$ | $O_{max}$ | $O_{avg}$ | T |
|---|---|---|---|---|---|---|
| G1 | 800 | 19176 | 12083 | 0.9591 | 0.9516 | 498.82 |
| G6 | 800 | 19176 | 2656 | 0.9559 | 0.9506 | 471.06 |
| G11 | 800 | 1600 | 629 | 0.9384 | 0.9254 | 406.24 |
| G14 | 800 | 4694 | 3191 | 0.9367 | 0.9274 | 498.26 |
| G18 | 800 | 4694 | 1166 | 0.9308 | 0.9223 | 430.24 |
| G22 | 2000 | 19990 | 14136 | 0.9349 | 0.9277 | 768.34 |
| G27 | 2000 | 19990 | 4141 | 0.9321 | 0.9270 | 780.18 |
| G32 | 2000 | 4000 | 1567 | 0.9328 | 0.9260 | 467.42 |

TABLE 4-continued

| Graph | V | E | $U_{SDP}$ | $O_{max}$ | $O_{avg}$ | T |
|---|---|---|---|---|---|---|
| G35 | 2000 | 11778 | 8014 | 0.9264 | 0.9202 | 602.34 |
| G39 | 2000 | 11778 | 2877 | 0.9214 | 0.9152 | 539.9 |
| C43 | 1000 | 9990 | 7032 | 0.9373 | 0.9309 | 542.92 |
| G48 | 3000 | 6000 | 6000 | 0.9463 | 0.9292 | 762.34 |
| G51 | 1000 | 5909 | 4006 | 0.9333 | 0.9242 | 491.68 |
| G55 | 5000 | 12498 | 11039 | 0.9070 | 0.9009 | 903.46 |
| G57 | 5000 | 10000 | 3885 | 0.9305 | 0.9259 | 648.72 |
| G59 | 5000 | 29570 | 7312 | 0.9114 | 0.9074 | 583.54 |
| G60 | 7000 | 17148 | 15222 | 0.9037 | 0.8995 | 918.98 |
| G62 | 7000 | 14000 | 5431 | 0.9295 | 0.9256 | 719.74 |
| G64 | 7000 | 41459 | 10466 | 0.9129 | 0.9092 | 666.16 |
| G65 | 8000 | 16000 | 6206 | 0.9284 | 0.9252 | 757.28 |
| G66 | 9000 | 18000 | 7077 | 0.9285 | 0.9251 | 786.9 |
| G67 | 10000 | 20000 | 7744 | 0.9285 | 0.9260 | 732.14 |
| G70 | 10000 | 9999 | 9863 | 0.9433 | 0.9379 | 687.28 |
| G72 | 10000 | 20000 | 7809 | 0.9284 | 0.9256 | 748.3 |
| G77 | 14000 | 28000 | 11046 | 0.9281 | 0.9256 | 842.24 |
| G81 | 20000 | 40000 | 15656 | 0.9268 | 0.9250 | 980.54 |

It can be seen that both the best and average outputs of the OPO network are about 2-6% better than the 0.878-performance guarantee of the celebrated Goemans-Williamson algorithm based on semidefinite programming (SDP). Since the differences between the best and the average values are within 1% for most of the instances, reasonable performance is expected for the OPO network even in a single run, which makes the OPO network favorable for applications when response time is the utmost priority. In addition, there is further room to improve the performance, for example by applying local improvement to the raw outcomes of the OPO network and operating the OPO network under optimum pump rate of p and coupling strength of $\xi$.

Figure 16:
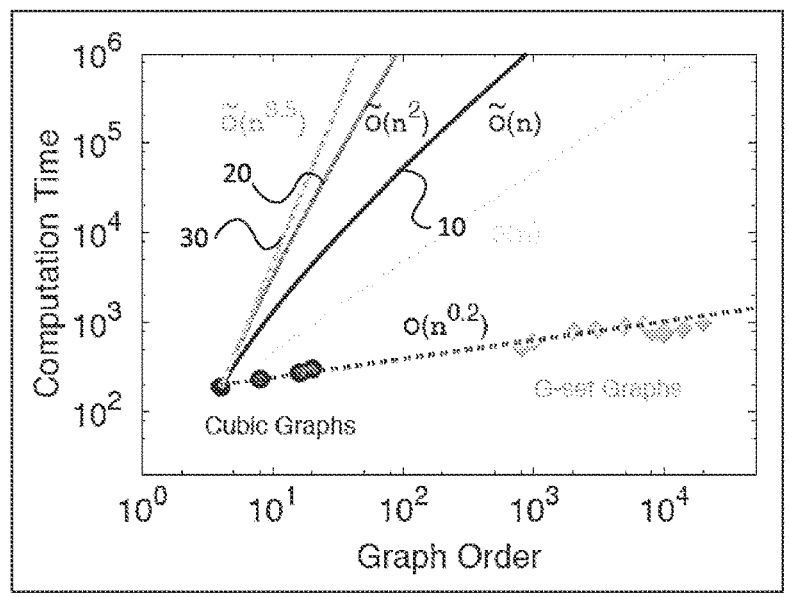
FIG. 16 illustrates average computation time of an example OPO network in solving MAX-CUT problems.

The average computational time of the OPO network in solving the MAX-CUT problem on the worst-case cubic and G-set graphs is displayed in FIG. 16. The growth of the computation time fits well to a sub-linear function $O(N^{0.2})$. Computational complexities of best-known algorithms for solving the SDP in the Goemans-Williamson algorithm are also plotted. If a graph with N vertices and m nodes is regular, the SDP can be approximately solved in almost linear time as $\tilde{O}(m)=O(m\log^2(N)\epsilon^{-4})$ using the matrix multiplicative weights method, where c represents the accuracy of the obtained solution. This behavior is shown by line 10 in FIG. 16. However, slower algorithms are required for general graphs. If the edge weights of the graph are all non-negative, the fastest algorithm runs in $\tilde{O}(Nm)=O(Nm\log^2(N)\epsilon^{-3})$ time based on a Lagrangian relaxation-based method. This computational time is plotted in FIG. 16 by line 20. For graphs with both positive and negative edge weights, the SDP is commonly solved using the interior-point method which scales as $\tilde{O}(N^{3.5})=O(N^{3.5}\log(1/\epsilon))$. This general computational time for SDP is shown by line 30 in FIG. 16. Since the OPO network is applicable to all types of graphs, the sub-linear scaling of the computation time gives it a huge advantage over the SDP algorithm in solving large-scale instances. For instance, the OPO network outputs a solution for the graph G81 with 20000 vertices and 40000 edges in a normalized time of $t\cong 980$, which corresponds to the actual time of $\tau=2t/\gamma_s\cong 1\times 10^{-2}$ seconds, since the photon lifetime in the large-scale fiber-based OPO network, which can handle this size of problem, is approximately $6\times 10^{-6}$ seconds. This computational time is compared to the time required to run the SDP (interior-point method) using a 1.7 GHz core i7 machine of about $1\times 10^5$ sec, which is seven orders of magnitude larger than the approximately $1\times 10^{-2}$ sec for the OPO network.

Measurement of Phase States

For the 4-OPO system (FIG. 11A), a one-bit delay interferometer was used for measuring the phase states. Table 5 shows the phase states and corresponding output pulse trains in the first and second columns. Since the complementary phase states result in the same output, for the 16 possible phase states, 8 different pulse trains can occur. In the measurements with a fast detector, no time reference is used, therefore only four different pulse patterns can be detected. If a slow detector is used, the output will be proportional to the number of ones in the pulse train. Therefore, there will be three distinct output average intensity levels; namely Im, Im/2, and 0, as shown in the third column of Table 5. All 16 possible phase states of the 4-OPO system are shown in Table 5, with the corresponding pulse trains at the output of the unequal-arm interferometer, and the detected intensity using a slow detector.

TABLE 5

| State | Interferometer Pulse Train | Slow Detector |
|---|---|---|
| $|0000\rangle$ | [1111] | $I_m$ |
| $|\pi 000\rangle$ | [0110] | $I_m/2$ |
| $|0\pi 00\rangle$ | [0011] | $I_m/2$ |
| $|\pi\pi 00\rangle$ | [1010] | $I_m/2$ |
| $|00\pi 0\rangle$ | [1001] | $I_m/2$ |
| $|\pi 0\pi 0\rangle$ | [0000] | 0 |
| $|0\pi\pi 0\rangle$ | [0101] | $I_m/2$ |
| $|\pi\pi\pi 0\rangle$ | [1100] | $I_m/2$ |
| $|000\pi\rangle$ | [1100] | $I_m/2$ |
| $|\pi 00\pi\rangle$ | [0101] | $I_m/2$ |
| $|0\pi 0\pi\rangle$ | [0000] | 0 |
| $|\pi\pi 0\pi\rangle$ | [1001] | $I_m/2$ |
| $|00\pi\pi\rangle$ | [1010] | $I_m/2$ |
| $|\pi 0\pi\pi\rangle$ | [0011] | $I_m/2$ |
| $|0\pi\pi\pi\rangle$ | [0110] | $I_m/2$ |
| $|\pi\pi\pi\pi\rangle$ | [1111] | $I_m$ |

Experimental Setup

A system similar to the one shown in FIG. 11A was used for some experiments. The ring resonator 1110 of the OPO illustrated in FIG. 11A has a round trip time of 16 ns (a perimeter of about 4.8 m). The actual setup included two more flat mirrors than shown in FIG. 11A (corresponding to a folded bow tie configuration). The flat mirrors, except $M_1$, are gold coated with enhancement dielectric coatings at 2 μm. One of the flat gold mirrors is placed on a translation stage with piezoelectric actuator (PZT). The dielectric mirror (M1) has a coating which is antireflective at the pump wavelength with less than 0.2% reflection, and is highly reflective (about 99%) from 1.8 μm to 2.4 μm. The curved mirrors ($M_3$ and $M_4$) have 50-mm radius of curvature and are unprotected gold coated mirrors. The angle of incidence on these mirrors is 4°, which was chosen to compensate the astigmatism introduced by the Brewster-cut nonlinear crystal, resulting in about 1 mm of cavity stability range for the spacing between the curved mirrors. The signal beam has a waist radius of 8.3 μm ($1/e^2$ intensity) at the center of the crystal.

A 1-mm long, Brewster-cut, MgO:PPLN crystal has a poling period of 31.254 μm, which is designed to provide degenerate parametric gain for a pump at 1035 nm with type 0 phase matching (e→e+e) at 373 K temperature. The crystal operates at room temperature in the OPO, and even though the phase matching condition is not optimal for the pump (centered at 1045 nm), degenerate operation is achieved by length tuning of the cavity.

Input and output coupling of the signal are achieved with 2-μm thick nitrocellulose pellicles to avoid dispersion in the cavity and etalon effects. In FIG. 11A, the three pairs 1120 of "OC" and "IC" are uncoated pellicles (with 2-6% power reflection), the "OC" for the main output is coated (with 15% power reflection at 2090 nm). The beam splitter in the interferometer (BS) is the same coated pellicle. For stabilizing the OPO cavity, another uncoated pellicle is used as an output coupler in the resonator (not shown).

The pump is a free-running mode-locked Yb-doped fiber laser (Menlo Systems Orange) producing approximately 80 fs pulses centered at 1045 nm with a repetition rate of 250 MHz, and maximum average power of >1 W. The filter is a long pass filter at 1850 nm on a Ge substrate to eliminate the pump and transmit the signal.

Gradual pumping is achieved by the chopper, as it causes a rise time (10-90% power) of 180 μs for introducing the pump. The cavity photon lifetime for the signal is estimated to be 60 ns, and the network is pumped approximately 2.2 times above threshold.

Five feedback servo controllers were used to stabilize the length of the cavity, the phase of the delay lines, and the arm-length difference of the interferometer. The controllers are based on a "dither-and-lock" scheme, where a slight modulation (less than 10 nm amplitude at a frequency between 5 and 20 kHz) is applied to a fast PZT, and the error signal is generated electronically by mixing the detector output and the modulated signal. Identical electronic circuits are used with a controller 3-dB bandwidth of 10 Hz.

For the delay lines, the interference of the pump at the other port of the input couplers is used as the input of the controller, and the controller locks the length to achieve destructive interference on the detector, which results in constructive interference on the other port that enters the cavity. The arm length difference of the interferometer is also locked similarly. No phase stabilization is required for the path from the OPO to the interferometer since all the OPO pulses experience the same path and phase change.

The servo controllers used in the experiment suffice for implementation of the Ising machine, and no stabilization on the pump is required. Slow changes (within the response time of the controller) in the carrier-envelop offset frequency ($f_{CEO}^p$) and repetition rate ($f_R$) of the pump do not affect the operation of the Ising machine. Smooth changes in $f_R$ of the pump is intrinsically transferred to the signal since signal pulses are generated from pump pulses. However, the effects of changes in $f_{CEO}^p$ on the Ising machine require taking into account the intrinsic phase locking of the degenerate OPO as well as the role of servo controllers.

The primary task of the servo controller of the OPO is to maximize the output power by matching the roundtrip phase in the resonator to the pulse to pulse phase slip of the pump ($\Delta\phi_p$). The pulse to pulse phase slip is related to $f_{CEO}^p$ by $$f_{CEO}^p = \frac{\Delta\phi_p}{2\pi} f_R. \tag{38}$$

Assuming the carrier fields for the pump and the signal pulses are defined as $\exp(j\omega_p t + \phi_p)$ and $\exp(j\omega_s t + \phi_s)$, respectively, the phase-sensitive gain dictates $\phi_p$ as shown in equation (39).

$$\phi_p = 2\phi_s + \pi/2 \tag{39}$$

Therefore, if the carrier phase of the pump changes by $\Delta\phi_p$ from one pulse to next, for a single OPO ($T_{cavity}=T_R$), the pulse to pulse phase slip of the signal is given in equation (40).

$$\Delta\phi_s = \Delta\phi_p/2 \tag{40}$$

This means that the phase slip of the signal pulses is locked to the phase slip of the pump with a factor of half, which consequently means the $f_{CEO}$ of the pump and signal are locked; the servo loop provides feedback to the cavity to follow this phase slip and maximize the output power. A similar behavior also happens for a doubly-resonant OPO operating away from degeneracy, with a different ratio between the $f_{CEO}$ of the pump and signal.

For N OPOs in the cavity (i.e., $T_{cavity}=NT_R$), when all OPOs are in the same phase state, the pulse to pulse phase slip in the pump transfers to the OPO to OPO phase slip by a factor of half. Changing phase state from one OPO to another simply means adding it to the phase slip. When a delay line is locked to the top of the interference fringe of the pump pulses, the phase change provided by the delay line at the pump wavelength compensates the pulse to pulse phase slip of pump (i.e., $\phi_D(\omega_p)=\Delta\phi_p$). At the signal wavelength, because $\omega_s=\omega_p/2$ this phase change in the delay line is half (i.e., $\phi_D(\omega_s)=\phi_D(\omega_p)/2$), which means that the servo controller compensates the OPO to OPO phase slip resulting from the $f_{CEO}^p$.

Locking a delay line to top of the fringe of pump pulses corresponds to having either 0 or π phase change for the signal. This is also true for the interferometer. In the experiments, for all the servo controllers, it was possible to precisely tune the length from one fringe to the next. This provided the ability to try different configurations and find the desired coupling phases.

Figure 17A:
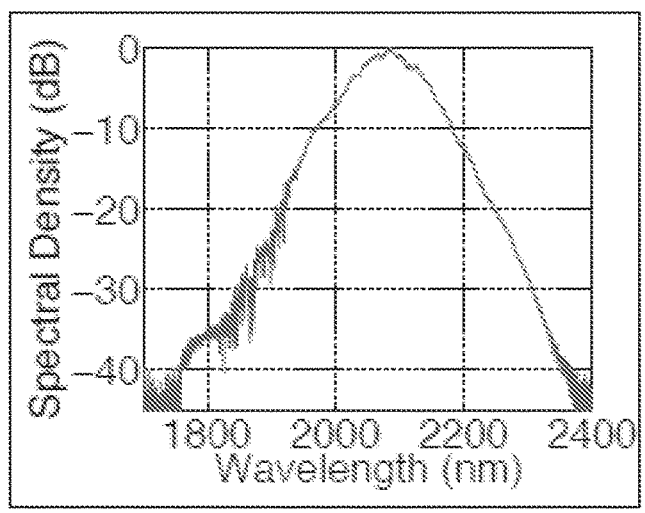
FIG. 17A illustrates an output spectrum.
Figure 17B:
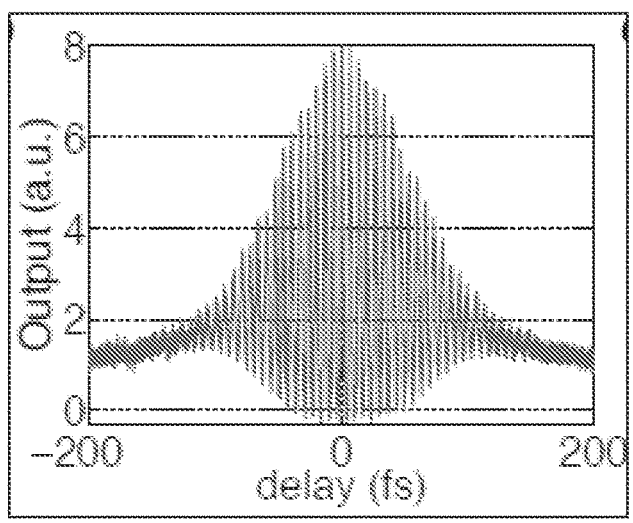
FIG. 17B illustrates an interferometric autocorrelation trace.
Figure 17C:
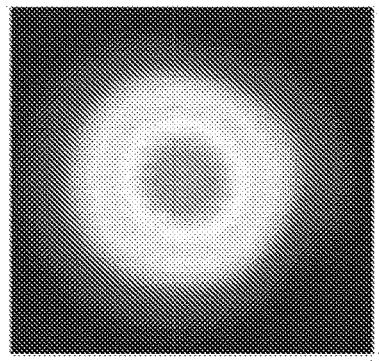
FIG. 17C illustrates a spatial beam profile.

When no output coupler is used in the cavity, the OPO has a threshold of 6 mW of pump average power. With all the output and input couplers in the cavity, the threshold reaches 135 mW. Oscillation at degeneracy and away from degeneracy can be achieved depending on the cavity length. The OPO is pumped with 290 mW and the main output of the OPO has 15 mW of average power at degeneracy centered at 2090 nm with the spectrum shown in FIG. 17A. The interferometric autocorrelation of the signal pulses is shown in FIG. 17B, suggesting a pulse length of approximately 85 fs. The spatial profile of the output beam is very close to Gaussian as shown in FIG. 17C, with a radius of about 1 mm (at $1/e^2$ intensity). The average power of the signal in the delay lines are approximately 2 mW, and the intracavity power is estimated to be approximately 100 mW.

Figure 18B:
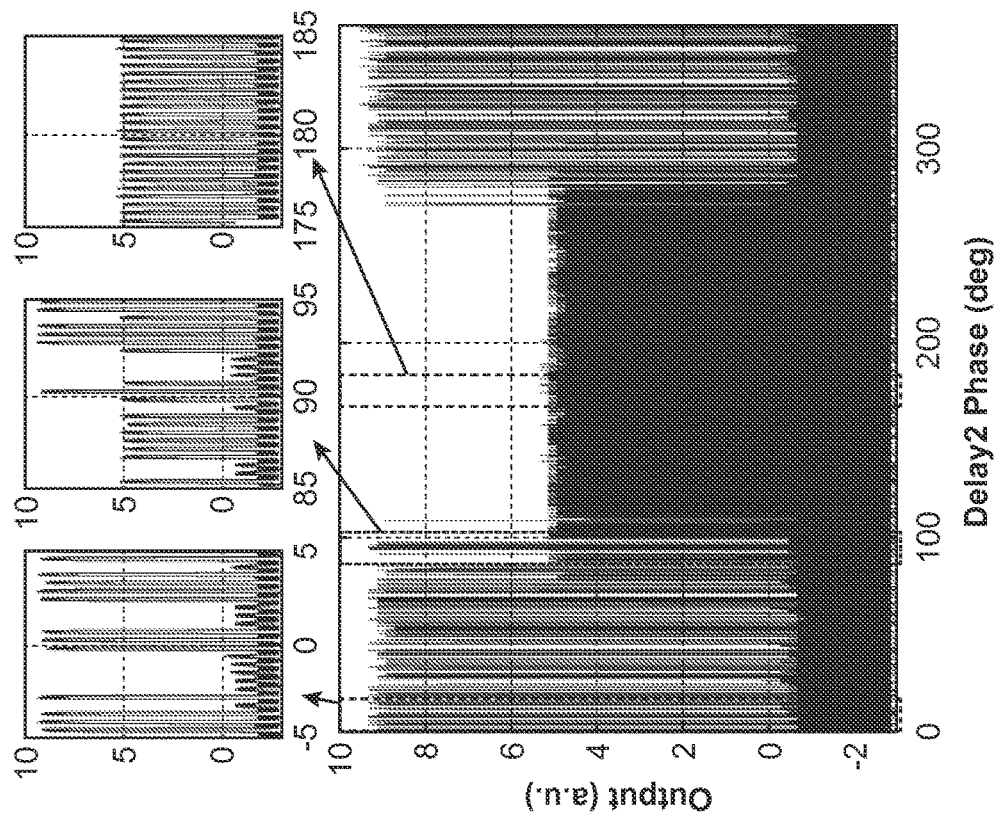
FIGS. 18A, 18B, 18C illustrate the output of a slow detector.
Figure 18A:
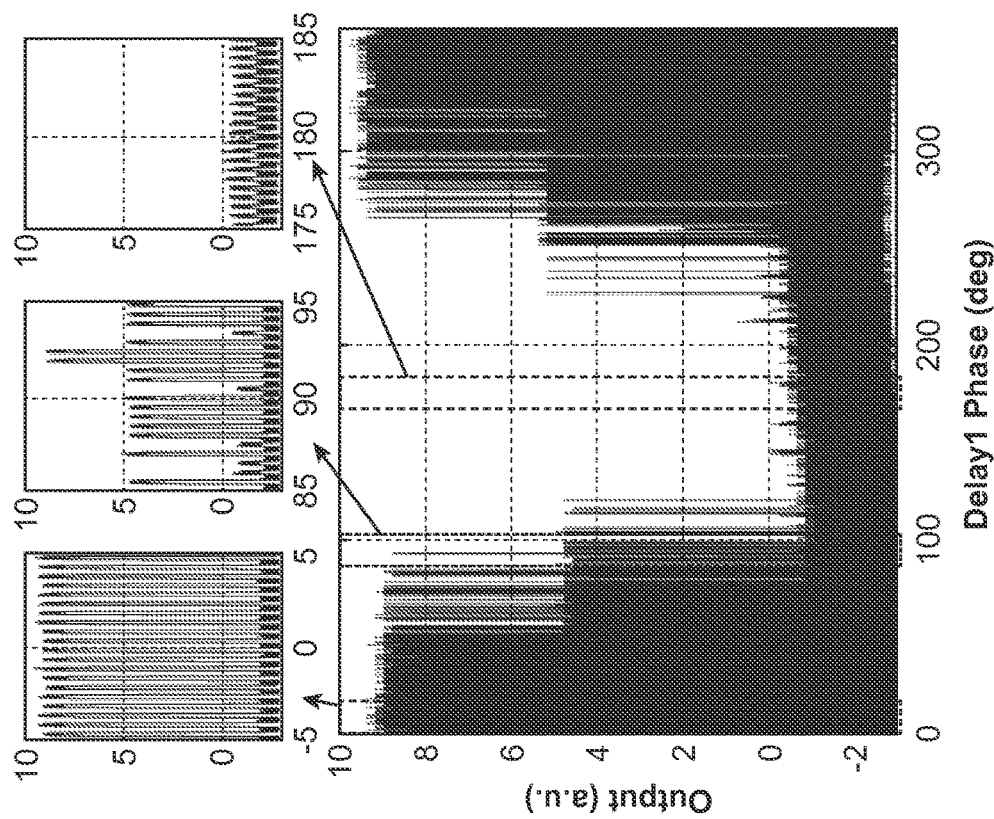
Figure 18C:
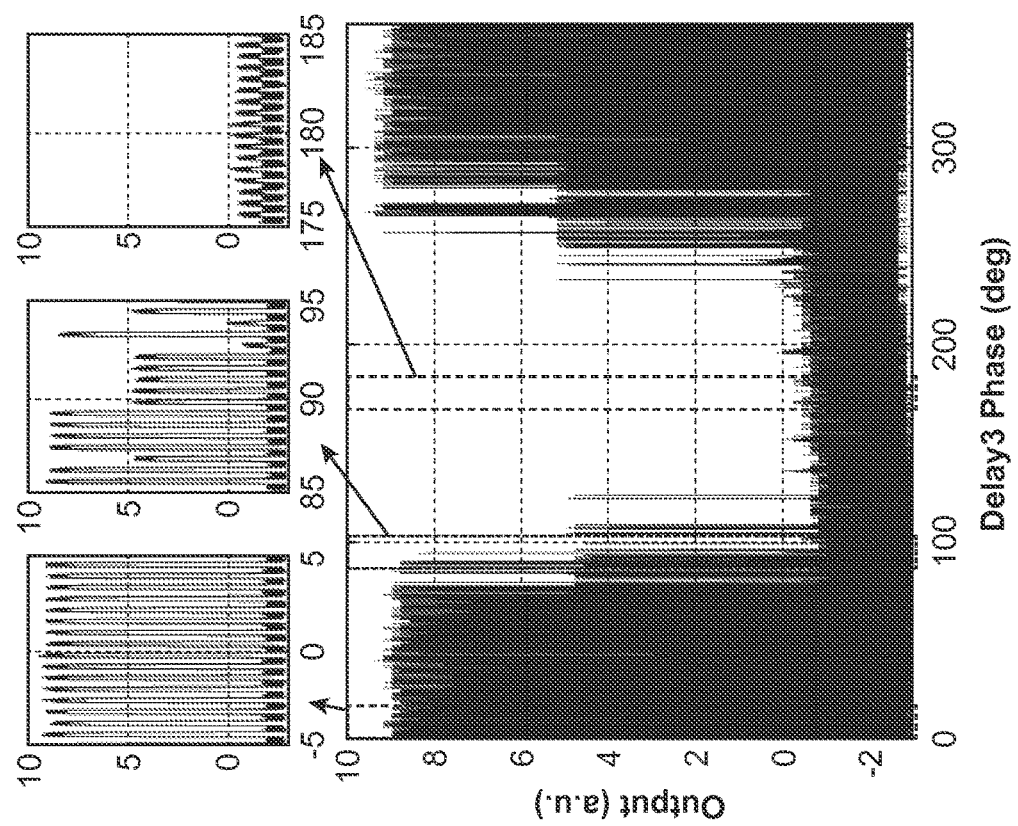

FIGS. 18A-F present results obtained using a slow detector for different combinations of couplings. FIGS. 18A-C are obtained by scanning the phase of one delay line while the other delay lines are blocked. Delay 1 and 3 have similar effects, because they couple adjacent OPOs but in different directions (see FIG. 11A). As shown in FIGS. 18A and 18C, in-phase coupling by these delays results in the same phase state for all OPOs, and consequently high-intensity interferometer output ($I_m$); and out-of-phase coupling results in alternating phase states and consequently low-intensity interferometer output (0).

In FIG. 18B, the interferometer output is shown while the phase of delay 2 is scanned. When the coupling is in-phase, OPO 1 and 3 have the same phase state, and OPO 2 and 4 oscillate in the same phase state. However, these two pairs can either be the same or different, and therefore the output would be either $I_m$ or 0, as shown in FIG. 18B around phase of zero. On the other hand, out-of-phase coupling of delay 2 results in constant output $I_m/2$ as shown in the same plot. Regenerative behavior of the OPO and its insensitivity to a wide range of phase change in the couplings are observed in these three plots.

Figure 19B:
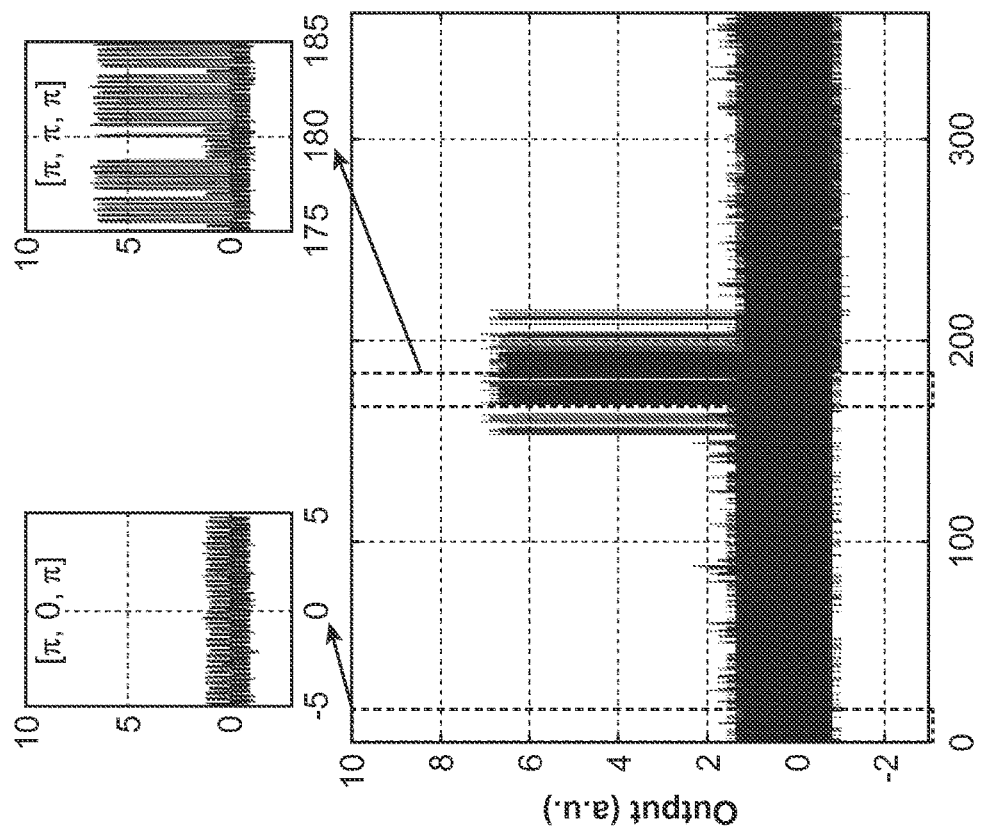
FIGS. 19A, 19B, 19C illustrate the output of a slow detector.
Figure 19A:
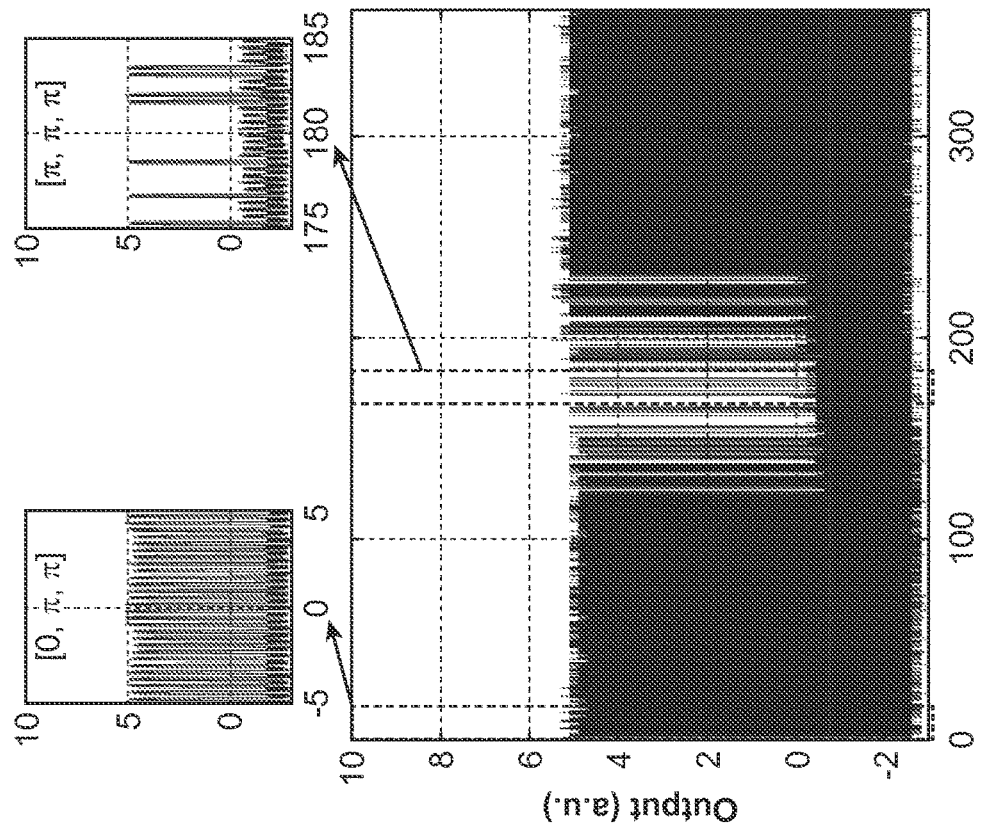
Figure 19C:
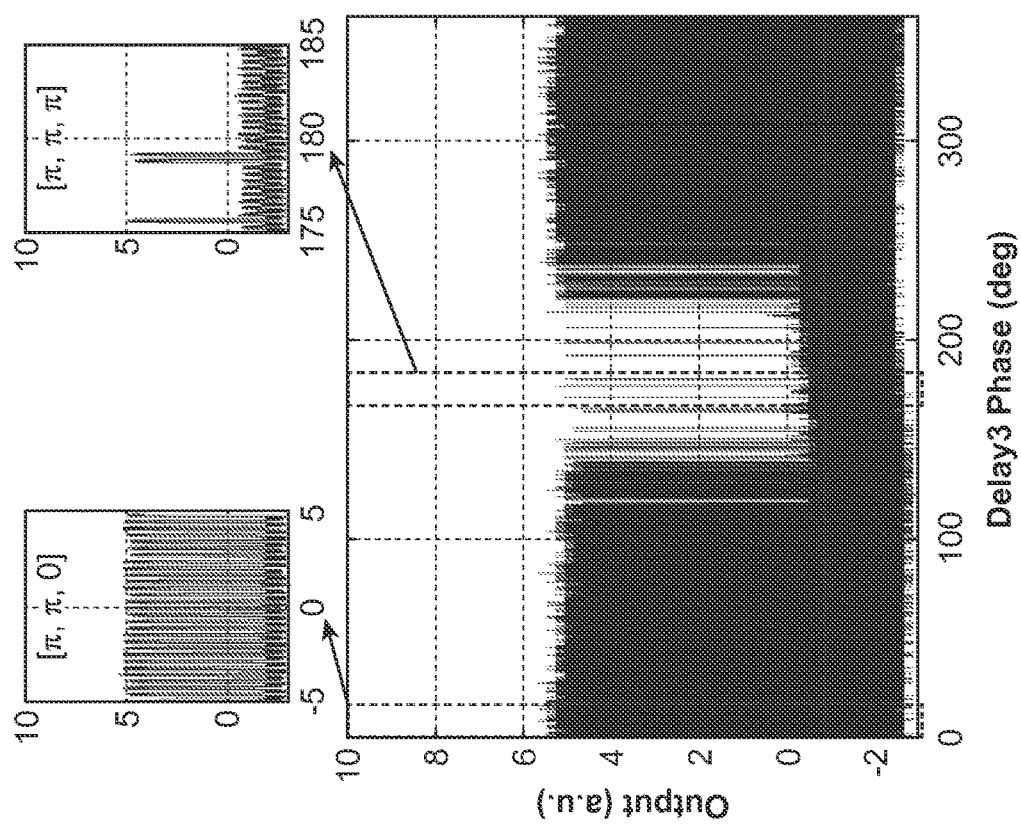

With the network configured to the MAX-CUT problem, the phase of the delays was scanned one by one, and the results shown in FIGS. 19A-19C. Different delay phase configurations and the expected outcomes are shown in Table 6, where the last row corresponds to the MAX-CUT problem with all anti-ferromagnetic couplings, and for each of the other rows one of the delay phases is different. For each plot in FIGS. 19A-19C, the center of the plot, where the phase of the scanned delay is π, corresponds to the anti-ferromagnetic MAX-CUT problem. The outputs follow the expected outcome.

TABLE 6

| Phase of Couplings [D1, D2, D3] | Expected Phase States | Slow Detector |
|---|---|---|
| [π, 0, π] | \|0π0π>, \|π0π0> | 100% in 0 |
| [0, π, π] | \|00ππ>, \|π00π>, \|0ππ0>, \|ππ00> | 100% in $I_m/2$ |
| [π, π, 0] | \|00ππ>, \|π00π>, \|0ππ0>, \|ππ00> | 100% in $I_m/2$ |
| [π, π, π] | \|00ππ>, \|π00π>, \|0ππ0>, \|ππ00>, \|0π0π>, \|π0π0> | 66.7% in $I_m/2$, 33.3% in 0 |

Time division multiplexing facilitates scalability of the OPO network, and it benefits from intrinsically identical nodes in the network. It is also worth noting that for an Ising problem with N sites, the number of possible couplings ($J_{ij}$) is $N^2-N$. However, in the time-division-multiplexed network only N−1 delay lines are required for realizing these couplings, which means that the physical size of the machine scales linearly with N.

Figure 20:
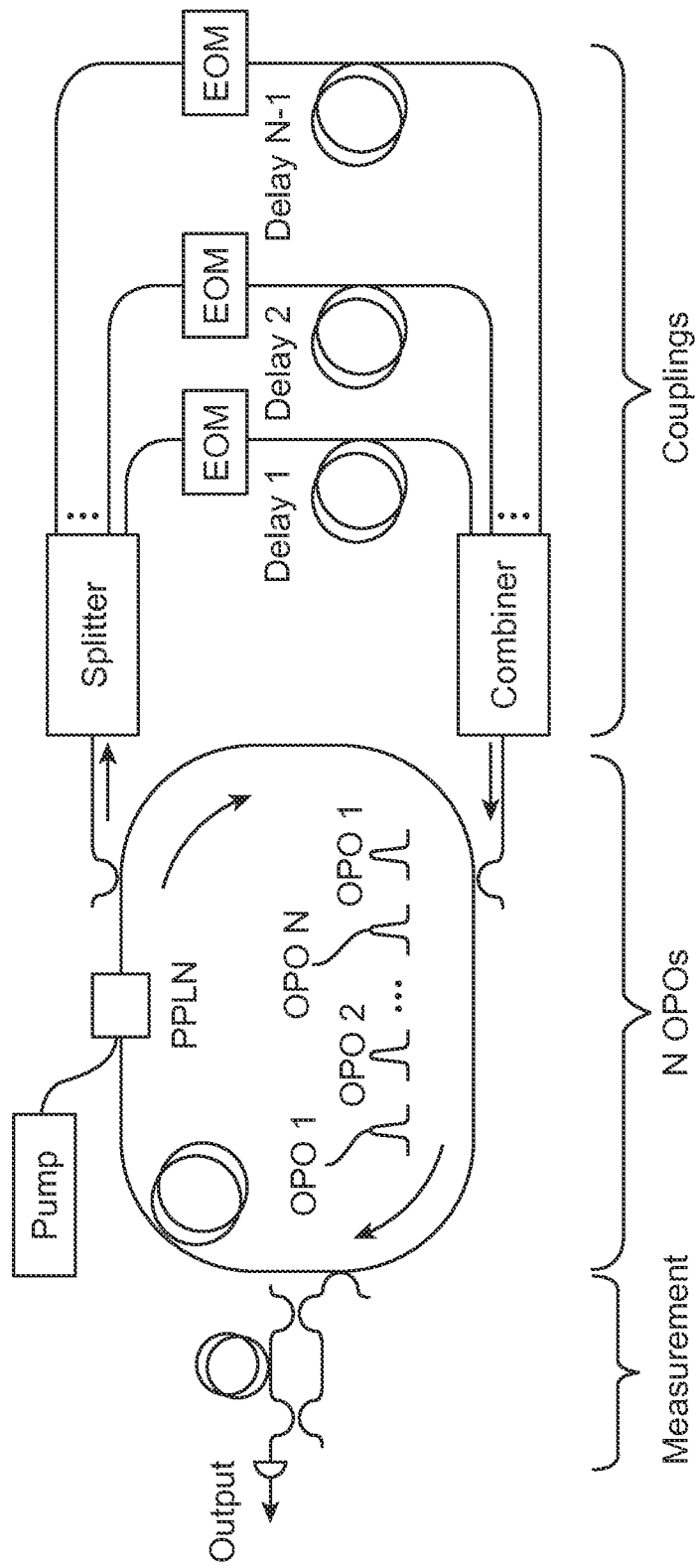
FIG. 20 illustrates an optical computation machine in a fiber-based implementation.

A network of N OPOs can be realized in a single ring resonator with a round-trip time of $T_{cavity}=NT_R$ ($T_R$ is the pulse-to-pulse interval), and constructing N−1 delay lines. A fiber-based implementation of such a machine is illustrated in FIG. 20. Using picosecond pump pulses enables implementation of a long resonator and long delay lines comprising optical fiber components. As an example, for a pump with 10-GHz repetition frequency ($T_R$=100 ps), a resonator with 200 m of optical fiber results in 10000 temporally separated OPOs. An expected photon lifetime of such a fiber-based OPO network is about $\gamma^{-1}$,z 6×10⁻⁶s, which promises a reasonably fast computational time for a MAX-CUT problem with N=10000. The main challenge is stabilizing the phases of the fiber links Use of low-noise phase-stabilized long (about 100-km) optical fibers can overcome this challenge. Moreover, the regenerative behavior suggests that the OPO-based Ising machine can tolerate relatively large phase noise in the couplings.

Similar to the 4-OPO network, each delay line provides a delay of equal to an integer multiple of the repetition period ($mT_R$), and is responsible for multiple of the Ising coupling terms in the form of $J_{(i)(i+m)}$. In one delay line, each of these couplings happens at one time slot, and one can use electro-optic phase and amplitude modulators (EOM) to synchronously switch the delay on and off depending on whether the corresponding coupling term is zero or not. This can be extended to synchronously controlling the phases and strengths of the couplings through the delay lines, and hence programming any arbitrary Ising problem on the machine.

Thus has been described an optical computing machine scalable to solve complex computing problems. The computing machine uses time division multiplexing of optical pulses, in a network of OPOs implemented in an optical cavity or in optical fibers (or a combination of an optical cavity and optical fibers). The pump energy may be of constant amplitude, or may be of increasing amplitude starting below an oscillation threshold. Optical couplers are used to couple the OPOs together through delay components. The couplers may be introduced abruptly or gradually, and may be introduced before or after pumping begins. The phase states of the OPOs are measured, and the phase states alone or in combination indicate a solution to a computational problem. The measurement may be performed below or above the oscillation threshold (i.e., a quantum or a classical measurement, respectively.)

Figure 21:
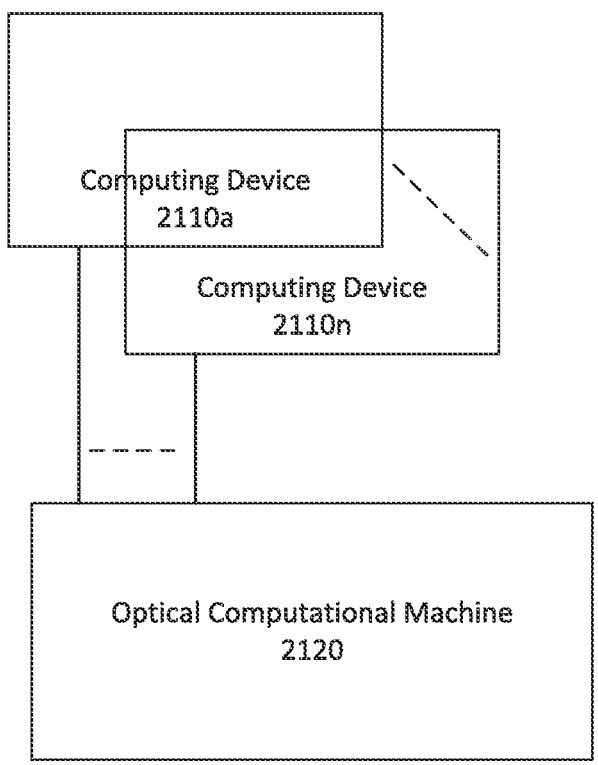
FIG. 21 illustrates a system according to this disclosure.

In the embodiments described in this disclosure, reference has been made to various types of system control, such as pump control, optical coupling control, and mirror control. For example, the pump frequency, ramp rate, amplitude, gain and other parameters may be controlled, and the optical coupling devices may be controlled to be on or off, and for abrupt or gradual change between on and off. Additionally, reflective surfaces in an optical cavity or in an interferometer may be controlled to set or fine-tune path length or configuration. Control of the optical couplings and control of the reflective surfaces may be individual, in banks, or all together. By way of example, optical coupling devices may be controlled individually, or as a group. Control of these various devices may be performed by one or more computing devices, as indicated in FIG. 21, where a number of computing devices 2110a through 2110n is in communication with one or more controllable devices in an optical computational machine 2120, the computational machine 2120 being in accordance with this disclosure. Each computing device includes a processing device executing instructions. The processing device may be one or more of a processor, microprocessor, microcontroller, ASIC, and/or FPGA, along with associated logic. The instructions may be coded in hardware, or coded in firmware or software, or coded in some combination of hardware, firmware, or software. Firmware and software may be stored in a memory. Memory may be one or both of volatile and non-volatile memory for storing information. Examples of memory include semiconductor memory devices such as EPROM, EEPROM and flash memory devices, magnetic disks such as internal hard disks or removable disks, magneto-optical disks, CD-ROM and DVD-ROM disks, and the like.

An embodiment of the disclosure relates to a non-transitory computer-readable storage medium having computer code thereon for performing various computer-implemented operations. The term "computer-readable storage medium" is used herein to include any medium that is capable of storing or encoding a sequence of instructions or computer codes for performing the operations, methodologies, and techniques described herein. The media and computer code may be those specially designed and constructed for the purposes of the disclosure, or they may be of the kind well known and available to those having skill in the computer software arts. Examples of computer-readable storage media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as ASICs, programmable logic devices (PLDs), and ROM and RAM devices.

Examples of computer code include machine code, such as produced by a compiler, and files containing higher-level code that are executed by a computer using an interpreter or a compiler. For example, an embodiment of the disclosure may be implemented using Java, C++, or other object-oriented programming language and development tools. Additional examples of computer code include encrypted code and compressed code. Moreover, an embodiment of the disclosure may be downloaded as a computer program product, which may be transferred from a remote computer (e.g., a server computer) to a requesting computer (e.g., a client computer or a different server computer) via a transmission channel. Another embodiment of the disclosure may be implemented in hardwired circuitry in place of, or in combination with, machine-executable software instructions.

While certain conditions and criteria are specified herein, it should be understood that these conditions and criteria apply to some embodiments of the disclosure, and that these conditions and criteria can be relaxed or otherwise modified for other embodiments of the disclosure.

As used herein, the singular terms "a," "an," and "the" include plural referents unless the context clearly dictates otherwise. Thus, for example, reference to an object can include multiple objects unless the context clearly dictates otherwise.

As used herein, the terms "substantially", "approximately" and "about" are used to describe and account for small variations. When used in conjunction with an event or circumstance, the terms can refer to instances in which the event or circumstance occurs precisely as well as instances in which the event or circumstance occurs to a close approximation. For example, the terms can refer to less than or equal to ±10%, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

While the invention has been described with reference to the specific embodiments thereof, it should be understood by those skilled in the art that various changes may be made and equivalents may be substituted without departing from the true spirit and scope of the invention as defined by the appended claim(s). In addition, many modifications may be made to adapt a particular situation, material, composition of matter, method, operation or operations, to the objective, spirit and scope of the invention. All such modifications are intended to be within the scope of the claim(s) appended hereto. In particular, while certain methods may have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

The invention claimed is:

1. A computational machine, comprising:
    an optical device configured to receive energy from an optical energy source and generate a number N1 of optical signals, N1 is 2 or greater; and
    a number N2 of coupling devices, each of which controllably couples a plurality of the number N1 of optical signals, N2 is 1 or greater;
    wherein the coupling devices are individually controlled to simulate a computational problem.

2. The computational machine of claim 1, wherein the optical energy source is a laser.

3. The computational machine of claim 1, further comprising a controller configured to control the optical energy source to produce energy in a predefined pattern.

4. The computational machine of claim 1, wherein the number N2 is equal to one half of the value N1 squared minus N1 (N2=(N1^2−N1)/2.

5. The computational machine of claim 1, wherein the number N2 is equal to the value N1 minus one (N2=N1−1).

6. The computational machine of claim 1, wherein the number N2 is equal to one (N2=1).

7. The computational machine of claim 1, wherein the N1 optical signals are generated from a plurality of optical parametric oscillators (OPOs).

8. The computational machine of claim 7, wherein the OPOs are implemented using microresonators.

9. The computational machine of claim 1, configured to produce and maintain the N1 optical signals within one resonant cavity or one optical fiber.

10. The computational machine of claim 1, wherein the coupling devices include electro-optic modulators (EOMs).

11. The computational machine of claim 1, wherein the computational problem is one of a nondeterministic polynomial (NP) problem, an Ising problem, or an optimization problem.

12. The computational machine of claim 1, configured to produce a set of numbers from a plurality of the N1 signals, wherein the produced numbers contain information about a solution of the computational problem.

13. The computational machine of claim 12, wherein the produced numbers determine a solution to the computational problem.

14. The computational machine of claim 12, wherein the produced numbers are generated from the phases of a plurality of the N1 signals.

15. The computational machine of claim 12 configured to provide a phase reference, wherein at least one of the N1 optical signals is compared to the phase reference to produce the numbers.

16. The computational machine of claim 12, wherein at least two of the N1 signals are compared to each other to produce the numbers.

17. A computational machine, comprising:
    a number N1 of parametric oscillators, N1 is 2 or greater; and
    a number N2 of coupling devices, each of which controllably couples a plurality of the number N1 of parametric oscillators together, N2 is 1 or greater;
    wherein the coupling devices are individually controlled to simulate a computational problem.

18. The computational machine of claim 17, wherein the parametric oscillators are optical parametric oscillators.

19. The computational machine of claim 18, wherein the optical parametric oscillators are selected from continuous wave degenerate optical parametric oscillators and pulsed degenerate optical parametric oscillators.

20. The computational machine of claim 17, wherein the parametric oscillators are time-multiplexed in one optical cavity or optical fiber.

\* \* \* \* \*